(12) United States Patent
Fujii et al.

(10) Patent No.: US 12,375,511 B2
(45) Date of Patent: Jul. 29, 2025

(54) ATTACK PATH GENERATION METHOD AND ATTACK PATH GENERATION DEVICE

(71) Applicant: PANASONIC INTELLECTUAL PROPERTY MANAGEMENT CO., LTD., Osaka (JP)

(72) Inventors: Takayuki Fujii, Osaka Fu (JP); Kaoru Yokota, Hyogo Ken (JP); Shoichiro Sekiya, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 18/101,773

(22) Filed: Jan. 26, 2023

(65) Prior Publication Data
US 2023/0319085 A1 Oct. 5, 2023

(30) Foreign Application Priority Data
Mar. 29, 2022 (JP) ................................ 2022-054604

(51) Int. Cl.
*H04L 9/40* (2022.01)
(52) U.S. Cl.
CPC ...... *H04L 63/1425* (2013.01); *H04L 63/1433* (2013.01)
(58) Field of Classification Search
CPC ............. H04L 63/1425; H04L 63/1433; H04L 63/1416; H04L 63/1408; H04L 63/1441; H04L 2463/146
See application file for complete search history.

(56) References Cited

U.S. PATENT DOCUMENTS

| 11,770,387 B1* | 9/2023 | Shivamoggi ........ H04L 63/1441 726/23 |
| 2015/0199623 A1* | 7/2015 | Andersson ........... G06Q 10/063 705/7.11 |

(Continued)

FOREIGN PATENT DOCUMENTS

| JP | 2005-101854 | 4/2005 |
| JP | 6831763 B2 | 2/2021 |

OTHER PUBLICATIONS

Ficke et al., "APIN: Automatic Attack Path Identification in Computer Networks," 2020 IEEE International Conference on Intelligence and Security Informatics (ISI) Year: 2020 | Conference Paper | Publisher: IEEE.*

(Continued)

*Primary Examiner* — Roderick Tolentino
(74) *Attorney, Agent, or Firm* — Greenblum & Bernstein, P.L.C.

(57) ABSTRACT

An attack path generation method according to the present disclosure is an attack path generation method executed by acquiring logs in devices connected to a network including at least one of a branch and a merge where each device has an attack detection function. The method includes: generating a primary-attack path without the branch and merge based on the acquired logs; generating a secondary-attack path branching from the primary-attack path or merging with the primary-attack path based on the logs; and outputting the generated primary-attack path and secondary-attack path to a device that performs attack-determination. The secondary-attack path is an attack path including an upstream or downstream device in which an event assumed to be an attack occurs within a certain period of time from an event assumed to be an attack on a device included in the (Continued)

primary-attack path and connected to the network merging/branching point.

11 Claims, 19 Drawing Sheets

(56) References Cited

U.S. PATENT DOCUMENTS

| | | | | |
|---|---|---|---|---|
| 2015/0381649 | A1* | 12/2015 | Schultz | G06Q 10/0635 |
| | | | | 726/25 |
| 2018/0191773 | A1* | 7/2018 | O'Connell | H04L 63/1458 |
| 2019/0384910 | A1* | 12/2019 | Orihara | G06F 21/56 |
| 2020/0358805 | A1* | 11/2020 | Segal | H04L 63/1433 |
| 2021/0075822 | A1 | 3/2021 | Chung et al. | |
| 2021/0117551 | A1* | 4/2021 | Maekawa | G06F 21/568 |
| 2021/0248443 | A1* | 8/2021 | Shu | H04L 63/1416 |
| 2022/0092177 | A1* | 3/2022 | Herwono | G06F 21/562 |
| 2023/0018096 | A1* | 1/2023 | Ueda | H04L 63/145 |

OTHER PUBLICATIONS

Yichao et al., "An Improved Attack Path Discovery Algorithm Through Compact Graph Planning," IEEE Access Year: 2019 | vol. 7 | Journal Article | Publisher: IEEE.*

Office Action from Japan Patent Office (JPO) in Japanese Patent Appl. No. 2022-054604, dated Jun. 10, 2025, together with an English language translation.

\* cited by examiner

FIG.4

| DATA NAME | DATE AND TIME | DEVICE TYPE | SENSOR TYPE | ABNORMALITY TYPE |
|---|---|---|---|---|
| DATA A | XXX | TCU | Firewall | AUTHENTICATION ERROR |
| DATA B | XXX | TCU | Firewall | AUTHENTICATION ERROR |
| DATA C | XXX | TCU | HIDS | PERMISSION ERROR |
| DATA D | XXX | Ether | NIDS | ID ERROR |
| DATA E | XXX | GW | HIDS | REPRO ERROR |
| DATA F | XXX | GW | HIDS | REPRO ERROR |
| DATA G | XXX | GW | HIDS | REPRO ERROR |
| DATA H | XXX | Ether | NIDS | ADD ERROR |
| DATA I | XXX | Ether | NIDS | ADD ERROR |
| DATA J | XXX | ADAS | Firewall | MAC ERROR |
| DATA K | XXX | ADAS | Firewall | MAC ERROR |
| DATA L | XXX | ADAS | Firewall | MAC ERROR |

FIG.5

| TIME SERIES | STEP 1 | STEP 2 | STEP 3 | STEP 4 | STEP 5 | STEP 6 |
|---|---|---|---|---|---|---|
| DATE AND TIME | xxx | xxx | xxx | xxx | xxx | xxx |
| DEVICE TYPE | TCU | TCU | Ether | GW | Ether | ADAS |
| SENSOR TYPE | Firewall | HIDS | NIDS | HIDS | NIDS | Firewall |
| ABNORMALITY TYPE | AUTHENTICATION ERROR | PERMISSION ERROR | ID ERROR | REPRO ERROR | ADD ERROR | MAC ERROR |

LGg

FIG.12

| SCENARIO ID | STEP 1 | STEP 2 | STEP 3 | ... |
|---|---|---|---|---|
| 1 | 1 | 1 | 1 | ... |
| 2 | 1 | 1 | 1 | ... |
| 3 | TCU-Firewall-AUTHENTICATION ERROR | TCU-HIDS-PERMISSION ERROR | Ether-NIDS-ID ERROR | ... |
| 4 | ... | ... | ... | ... |
| ... | ... | ... | ... | ... |

107b

ATTACK PATH GENERATION METHOD AND ATTACK PATH GENERATION DEVICE

CROSS-REFERENCE TO RELATED APPLICATIONS

This application is based upon and claims the benefit of priority from Japanese Patent Application No. 2022-054604, filed on Mar. 29, 2022, the entire contents of which are incorporated herein by reference.

FIELD

The present disclosure relates to an attack path generation method and an attack path generation device.

BACKGROUND

As a countermeasure against a cyberattack, a technology is disclosed in which attack patterns expected to occur in the future are defined in advance as attack scenarios and one attack scenario consistent with a log is specified.

However, if a plurality of attack paths simultaneously exist in a system, handling is difficult by the above technology that specifies one attack scenario.

SUMMARY

An attack path generation method executed by an information processing device according to the present disclosure includes generating an attack path in a plurality of devices by acquiring logs in the plurality of devices connected to a network including at least one of a branch and a merge, where each device has an attack detection function.

The attack path generation method includes generating a primary attack path without the branch and the merge on the basis of the acquired logs; generating a secondary attack path branching from the primary attack path or merging with the primary attack path on the basis of the logs; and outputting the generated primary attack path and the generated secondary attack path to a device that performs attack determination. The secondary attack path is an attack path including an upstream device or a downstream device in which an event assumed to be an attack occurs within a certain period of time from an event assumed to be an attack on a device included in the primary attack path and connected to a merging point or a branching point of the network.

BRIEF DESCRIPTION OF THE DRAWINGS

FIG. 4 is a diagram illustrating an example of a log acquired from an IDS sensor group by the IDM device according to the embodiment;

FIG. 5 is a diagram illustrating an example of data after the IDM device according to the embodiment performs grouping processing on the log acquired from the IDS sensor group;

FIG. 12 is a diagram illustrating an example of a known attack database used by the IDM device according to the embodiment to estimate an attack scenario;

DETAILED DESCRIPTION

An object of the present disclosure is to provide an attack path generation method and an attack path generation device capable of specifying an attack path even when a plurality of devices are simultaneously attacked.

Hereinafter, embodiments of an attack path generation method and an attack path generation device according to the present disclosure will be described with reference to the drawings.

Configuration Example of Attack Analysis System

Figure 1:
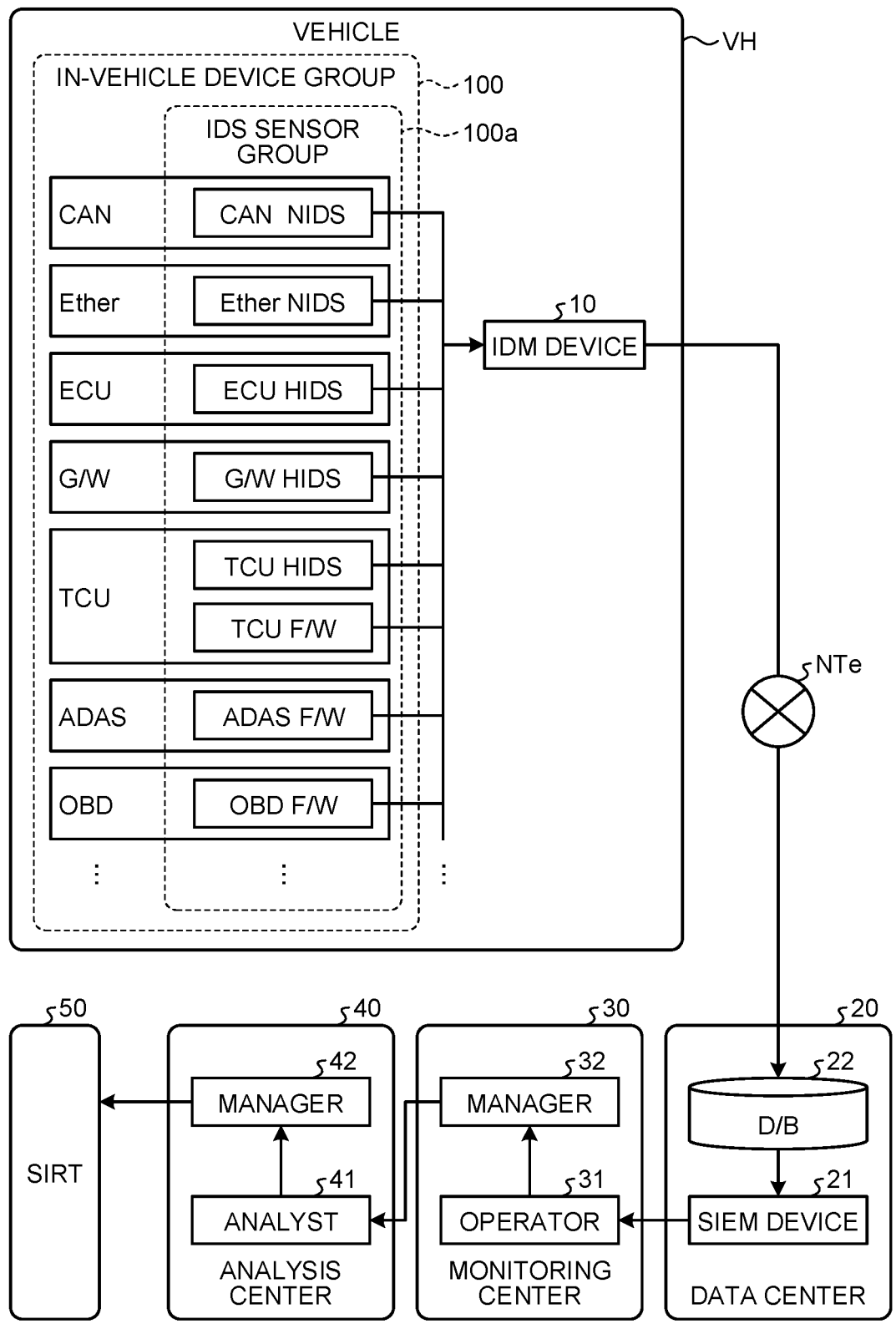
FIG. 1 is a diagram illustrating an example of a configuration of an attack analysis system according to an embodiment.

FIG. 1 is a diagram illustrating an example of a configuration of an attack analysis system according to an embodiment. The attack analysis system of the embodiment includes an integrated log monitoring device (hereinafter, an integrated detection log manager (IDM) device) 10 mounted on a vehicle VH, and supports analysis, countermeasures, and the like of the cyberattack on an in-vehicle device group 100 monitored by the IDM device 10.

The in-vehicle device group 100 includes various in-vehicle devices such as a controller area network (CAN), in-vehicle Ethernet (Ether), an in-vehicle electronic control unit (ECU), a gateway (G/W), a telematics control unit (TCU), advanced driver-assistance systems (ADAS), and on-board diagnostics (OBD).

The in-vehicle devices included in the in-vehicle device group 100 are network-connected to each other. The network to which the in-vehicle devices are interconnected may include at least one of a branch and a merge. In addition, these in-vehicle devices have an attack detection function by mounting an intrusion detection system (IDS) sensor described below.

The IDS sensors mounted on the in-vehicle device are a network based IDS (NIDS), a host-based IDS (HIDS), a firewall, or the like, and constitutes an IDS sensor group 100a.

The IDM device 10 as an attack path generation device is mounted on the vehicle VH and acquires a log including detection results of various events in the in-vehicle device group 100 from the IDS sensor group 100a. The various events recorded in the logs include an event assumed to be an attack on a predetermined in-vehicle device. The IDM device 10 monitors the in-vehicle device group 100 on the basis of these logs.

In addition, the IDM device 10 transmits the monitoring result of the in-vehicle device group 100 including the log from the IDS sensor group 100a to a data center 20 via a wireless external network NTe such as the Internet.

The data center 20 is connected to the IDM device 10 via the external network NTe and includes a security information and event management (SIEM) device 21 and a database 22. In the database 22, the monitoring result of the in-vehicle device group 100 from the IDM device 10 and the log of the IDS sensor group 100a are accumulated. The SIEM device 21 centrally manages these pieces of information accumulated in the database 22 and identifies the security incident by correlation analysis or the like.

A monitoring center 30 is a specialized organization belonging to a security operation center (SOC) that is specialized in monitoring a cyberattack on the in-vehicle device group 100 and taking measures against the cyberattack. When the SIEM device 21 of the data center 20 detects an abnormality, an operator 31 of the monitoring center 30 is notified of the abnormality. Upon receiving the report from the operator 31, a manager 32 raises the alert information to an analysis center 40.

The analysis center 40 is a specialized organization belonging to an SOC that is specialized in analyzing a cyberattack on the in-vehicle device group 100 and taking measures against the cyberattack. Upon receiving the alert information from the monitoring center 30, an analyst 41 of the analysis center 40 analyzes the abnormality detected by the SIEM device 21. A manager 42 of the analysis center 40 raises the alert information analyzed by the analyst 41 to a security incident response team (SIRT) 50.

The SIRT 50 is a professional team installed to respond to security incidents occurring in computers and networks. The alert information analyzed by the analysis center 40 is cooperated with the SIRT 50, and a more active response is advanced.

As described above, the in-vehicle device group 100 receives support of monitoring, analysis, countermeasures, and the like against the cyberattack by the hierarchical system including the IDM device 10. In such a hierarchical attack analysis system, it is important what form of data is transmitted from the IDM device 10 mounted on the vehicle VH to the data center 20.

Meanwhile, in order to reach a final attack target on one network, there is a case where a cyberattack such as simultaneous reconnaissance on a plurality of attack targets by following the network is performed. In such a case, a plurality of attack paths may occur simultaneously and frequently on one network.

As described below, the IDM device 10 generates an attack path to a plurality of in-vehicle devices included in the in-vehicle device group 100 on the basis of the logs collected from the IDS sensor group 100a, and uploads data including the generation result of the attack path to the database 22 of the data center 20.

Configuration Example of IDM Device

Next, an example of a hardware configuration and a functional configuration of the IDM device 10 will be described with reference to FIGS. 2 and 3.

Figure 2:
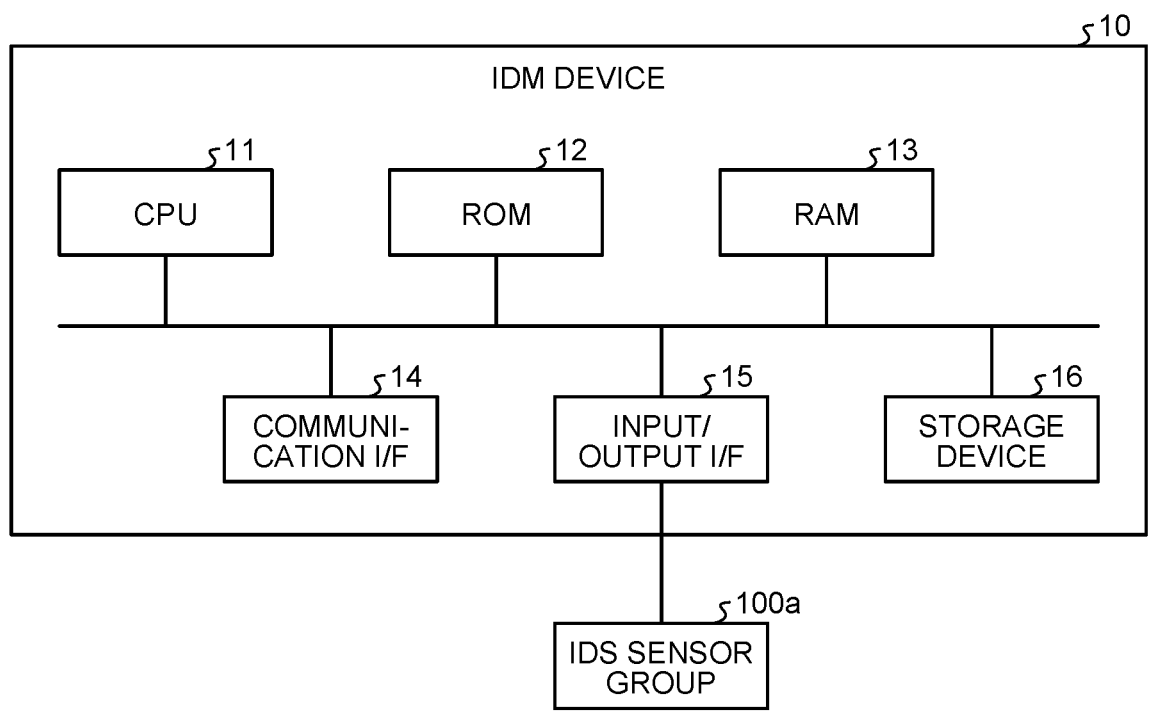
FIG. 2 is a block diagram illustrating an example of a hardware configuration of an IDM device according to the embodiment.

FIG. 2 is a block diagram illustrating an example of a hardware configuration of the IDM device 10 according to the embodiment. As illustrated in FIG. 2, the IDM device 10 is configured as an information processing device such as a computer including, for example, a central processing unit (CPU) 11, a read only memory (ROM) 12, and a random access memory (RAM) 13.

More specifically, the IDM device 10 includes the CPU 11, the ROM 12, the RAM 13, a communication interface (I/F) 14, an input/output I/F 15, and a storage device 16. The CPU 11, the ROM 12, the RAM 13, the communication I/F 14, the input/output I/F 15, and the storage device 16 are connected to each other by an internal bus. In addition, the IDS sensor group 100a is connected to the input/output I/F 15 via a network such as an in-vehicle CAN.

The CPU 11 controls the entire IDM device 10. The ROM 12 functions as a storage area in the IDM device 10. The information stored in the ROM 12 is retained even when the IDM device 10 is powered off. The RAM 13 functions as a primary storage device and serves as a work area of the CPU 11.

The CPU 11 implements the function of the IDM device 10 by loading the attack path generation program stored in the ROM 12 or the like in the RAM 13 and executing the attack path generation program.

The communication I/F 14 is configured to be connectable to a wireless external network NTe such as the Internet. Through the communication I/F 14, various types of information from the IDM device 10 can be uploaded to the database 22 of the data center 20 described above.

The input/output I/F 15 is connected to an external device such as the IDS sensor group 100a via a network such as an in-vehicle CAN. Various types of information including logs is collected from an external device such as the IDS sensor group 100a by the input/output I/F 15.

The storage device 16 is a hard disk drive (HDD), a solid state drive (SSD), or the like, and functions as an auxiliary storage device of the CPU 11.

As described above, the IDS sensor group 100a includes a plurality of IDS sensors such as NIDS, HIDS, a firewall, and the like. The plurality of IDS sensors are mounted on corresponding in-vehicle devices of the in-vehicle device group 100, respectively, and monitor the in-vehicle devices to generate logs.

Figure 3:
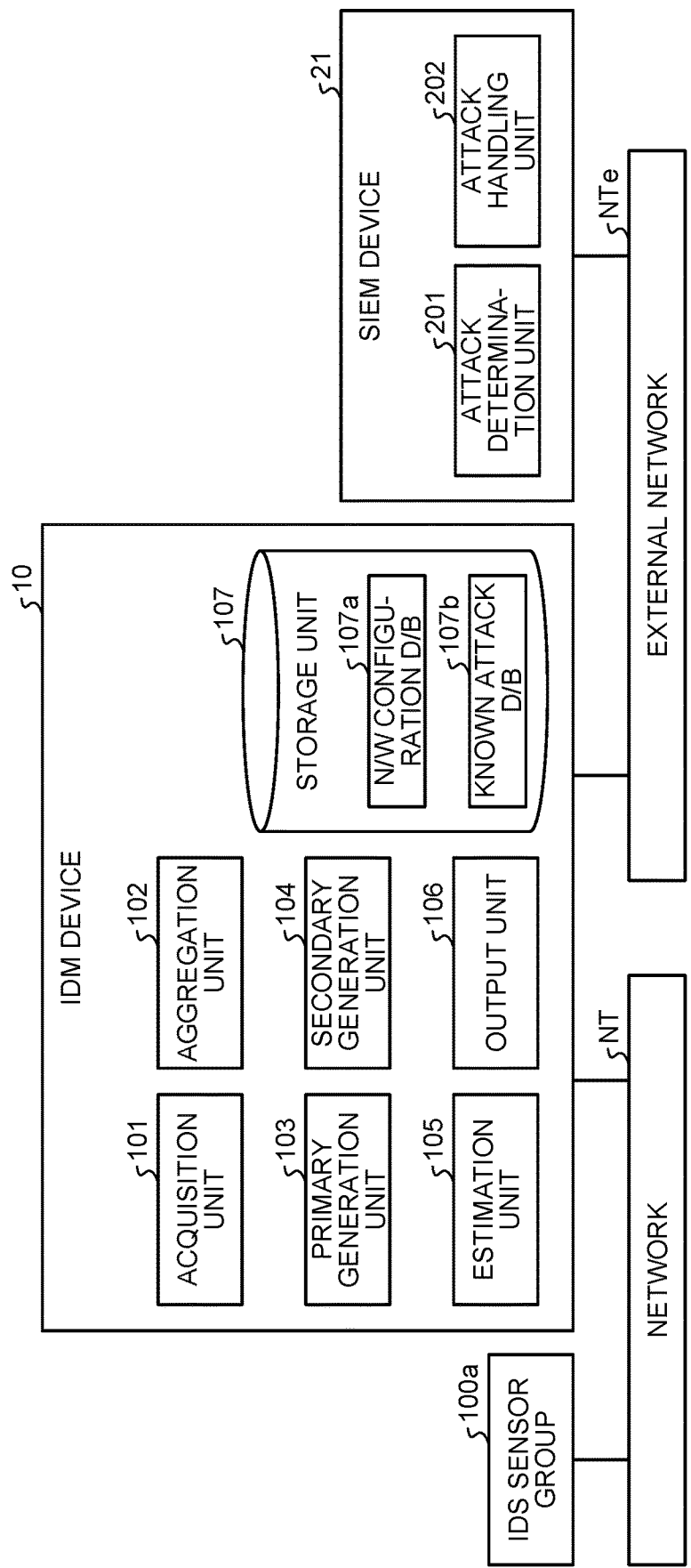
FIG. 3 is a block diagram illustrating an example of a functional configuration of the IDM device and an SIEM device according to the embodiment.

FIG. 3 is a block diagram illustrating an example of a functional configuration of the IDM device 10 and the SIEM device 21 according to the embodiment.

As illustrated in FIG. 3, the IDM device 10 includes, for example, an acquisition unit 101, an aggregation unit 102, a primary generation unit 103, a secondary generation unit 104, an estimation unit 105, an output unit 106, and a storage unit 107.

The acquisition unit 101 receives various types of information including a log from an external device such as the IDS sensor group 100a via the network NTc such as the in-vehicle CAN. The acquisition unit 101 is implemented by, for example, the input/output I/F 15 that operates under the control of the CPU 11 that is executing the attack path generation program.

The aggregation unit 102 aggregates the logs collected from the IDS sensor group 100a. In addition, the aggregation unit 102 refers to a network configuration database 107a stored in the storage unit 107, and performs fitting to apply the aggregated logs to the in-vehicle device group 100 on the network. The aggregation unit 102 is implemented by, for example, the CPU 11 executing the attack path generation program.

The primary generation unit 103 generates a primary attack path without a merge or a branch from the logs subjected to the fitting processing. The primary generation unit 103 is implemented by, for example, the CPU 11 executing the attack path generation program.

The secondary generation unit 104 generates a secondary attack path branching from the primary attack path generated by the primary generation unit 103 or merging with the primary attack path. The secondary generation unit 104 is implemented by, for example, the CPU 11 executing the attack path generation program.

The estimation unit 105 refers to a known attack database 107b stored in the storage unit 107, and estimates an attack scenario in an event assumed to be an attack on the in-vehicle device group 100 extracted by the aggregation unit 102 from an attack pattern that matches or is similar to the attack path generated by the primary generation unit 103 and the secondary generation unit 104. The estimation unit 105 is implemented by, for example, the CPU 11 executing the attack path generation program.

The output unit 106 outputs information such as the attack path generated by the primary generation unit 103 and the secondary generation unit 104 and the attack scenario estimated by the estimation unit 105 to the database 22 of the data center 20 via the external network NTe such as the Internet. The output unit 106 is implemented by, for example, the communication I/F 14 that operates under the control of the CPU 11 that is executing the attack path generation program.

The storage unit 107 stores various parameters necessary for processing performed by the IDM device 10, the attack path generation program executed by the IDM device 10, and the like. The storage unit 107 also stores the network configuration database 107a and the known attack database 107b. The storage unit 107 is implemented by, for example, the ROM 12, the RAM 13, the storage device 16, and the like that operate under the control of the CPU 11 that is executing an information providing program.

The network configuration database 107a retains information on the network configuration of the in-vehicle device group 100 to be interconnected. The known attack database 107b retains information on the known attack patterns expected to occur in the future.

The SIEM device 21 includes, for example, an attack determination unit 201 and an attack handling unit 202. The attack determination unit 201 makes an attack determination on an event assumed to be an attack on the in-vehicle device group 100 detected by the IDS sensor group 100a on the basis of the primary or secondary attack path and the estimated attack scenario received from the IDM device 10. When the attack determination unit 201 makes an attack determination, the attack handling unit 202 formulates a countermeasure against the attack on the in-vehicle device group 100.

Log Aggregation Example

Next, aggregation performed on a log by the aggregation unit 102 of the IDM device 10 will be described with reference to FIGS. 4 to 6. FIG. 4 is a diagram illustrating an example of a log LG acquired from the IDS sensor group 100a by the IDM device 10 according to the embodiment.

As illustrated in FIG. 4, the log acquired by the IDM device 10 from the IDS sensor group 100a includes, for example, information such as a date and time when an abnormality has occurred in the in-vehicle device group 100, an in-vehicle device type, an IDS sensor type, an abnormality type, and the like for each data A, B, C . . . . Here, the abnormality type is an event assumed to be an attack on the in-vehicle device group 100.

More specifically, the data A indicates that an authentication error is detected in a firewall (F/W) installed on the TCU at a predetermined date and time. In addition, the data E indicates that a reprogramming error is detected in the HIDS installed on the gateway at a predetermined date and time. In addition, the data H indicates that an address error is detected in the NIDS installed in the in-vehicle Ethernet at a predetermined date and time. In addition, the data L indicates that a message authentication code (MAC) error is detected in a firewall installed in the ADAS.

The aggregation unit 102 of the IDM device 10 groups these logs for each of the in-vehicle device type, the IDS sensor type, and the abnormality type, and arranges the logs in chronological order. FIG. 5 illustrates an example of data after grouping by the aggregation unit 102.

FIG. 5 is a diagram illustrating an example of data LGg after the IDM device 10 according to the embodiment performs grouping processing on the log LG acquired from the IDS sensor group 100a.

As illustrated in FIG. 5, in the data LGg after the processing by the aggregation unit 102, the log LG for each of the data A, B, C . . . is grouped by being divided into steps 1, 2, 3 . . . for each of the in-vehicle device type, the IDS sensor type, and the abnormality type. In the attack path generation processing described later, each of steps 1, 2, 3, . . . is treated as one attack step in the assumed attack.

The aggregation unit 102 fits the grouped data LGg to the network configuration of the in-vehicle device group 100. That is, the aggregation unit 102 applies the data LGg to the network configuration included in the in-vehicle device group 100 with reference to the network configuration database 107a stored in the storage unit 107. Data after the fitting processing is shown in FIG. 6.

Figure 6:
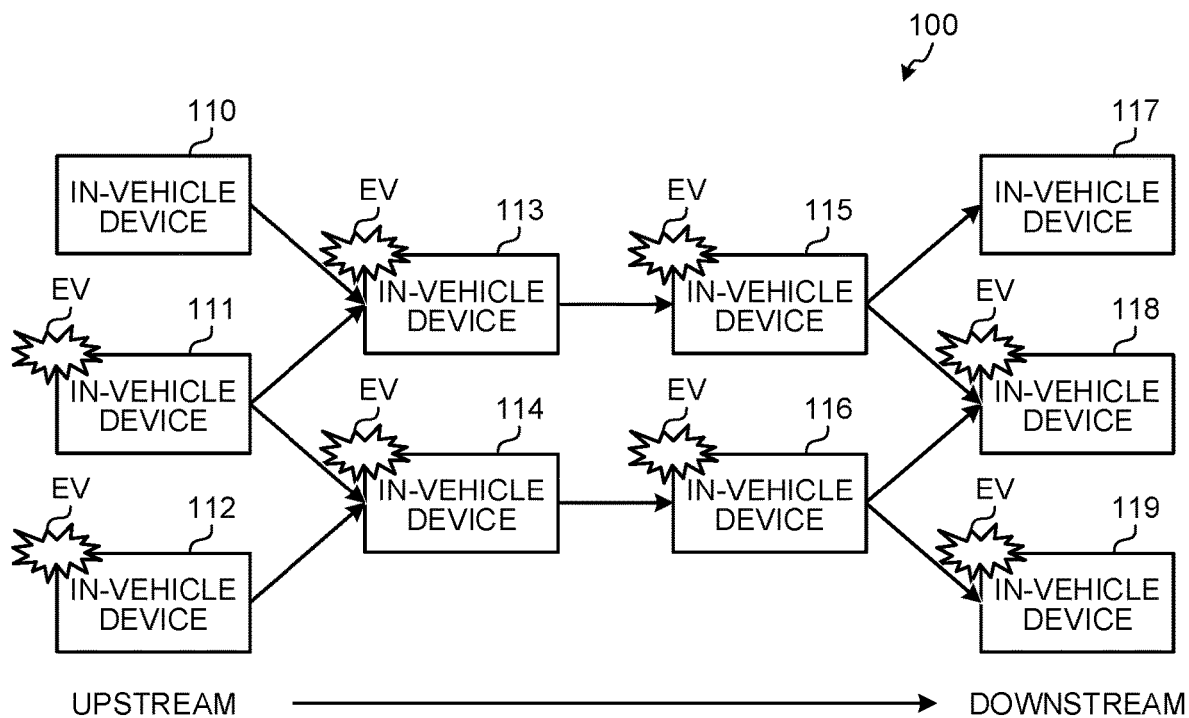
FIG. 6 is a diagram illustrating an example of data obtained by the IDM device according to the embodiment performing fitting processing on the log acquired from the IDS sensor group.

FIG. 6 is a diagram illustrating an example of data obtained by the IDM device 10 according to the embodiment performing the fitting processing on the log LG acquired from the IDS sensor group 100a. In the drawings from FIG. 6 to FIG. 11, for convenience of description, each in-vehicle device is not specified, and is illustrated as an in-vehicle device 110, 111, 112 . . . or the like. In the example of FIG. 6, the in-vehicle device group 100 mounted on the vehicle VH includes in-vehicle devices 110 to 119.

As illustrated in FIG. 6, in the data after the fitting processing, the in-vehicle devices 110 to 119 interconnected to the network on the basis of a known network configuration are illustrated. Among these in-vehicle devices 110 to 119, the in-vehicle device 110 side is the upstream side of the network, and the in-vehicle device 117 side is the downstream side.

In the example of FIG. 6, the network configuration of the in-vehicle devices 110 to 119 includes a branch and a merge.

That is, for example, the in-vehicle device 114 is connected to a merging point of network, and the multiple devices of the in-vehicle devices 111 and 112 on the upstream side are connected to the in-vehicle device 114. Further, for example, the in-vehicle device 116 is connected to a branching point of the network, and multiple devices of in-vehicle devices 118 and 119 on the downstream side, which are branch destinations of the network, are connected to the in-vehicle device 116.

The aggregation unit 102 generates the data illustrated in FIG. 6 in which an event EV that has occurred within a certain period of time among the plurality of events EV that have occurred in multiple devices of the in-vehicle devices 110 to 119 is considered as the event EV that has continuously occurred. This is because, if the event EV that has occurred in any of the in-vehicle devices 110 to 119 is greatly deviated from the timing at which another event EV has occurred, it is difficult to consider that the event EV is a part of a series of attacks by the same attacker.

In the example of FIG. 6, it is assumed that events EV assumed to be a series of attacks by the same attacker occur in the in-vehicle devices 111 to 116, 118, and 119 among the in-vehicle devices 110 to 119.

In the above-described network configuration, the in-vehicle devices 110 to 112 of the network's most upstream serve as an entrance, that is, an entry point, when accessing the network. That is, the in-vehicle devices 110 to 112 can be the first target by the cyberattack.

Primary Generation Example of Attack Path

Next, generation of a primary attack path performed by the primary generation unit 103 of the IDM device 10 on the data after the fitting processing of FIG. 6 will be described with reference to FIG. 7.

As described above, the primary generation unit 103 generates a primary attack path on the basis of the data after the fitting processing of FIG. 6. The primary attack path is a linear attack path without a branch and a merge.

At this time, the primary generation unit 103 selects an attack path including the in-vehicle device connected to a point at which there is no branch or merge on the network or a point at which there is as a few branches or merges as possible among the in-vehicle devices 111 to 116, 118, and 119 in which the event EV has occurred. FIG. 7 illustrates an example of the primary attack path generated by the primary generation unit 103.

Figure 7:
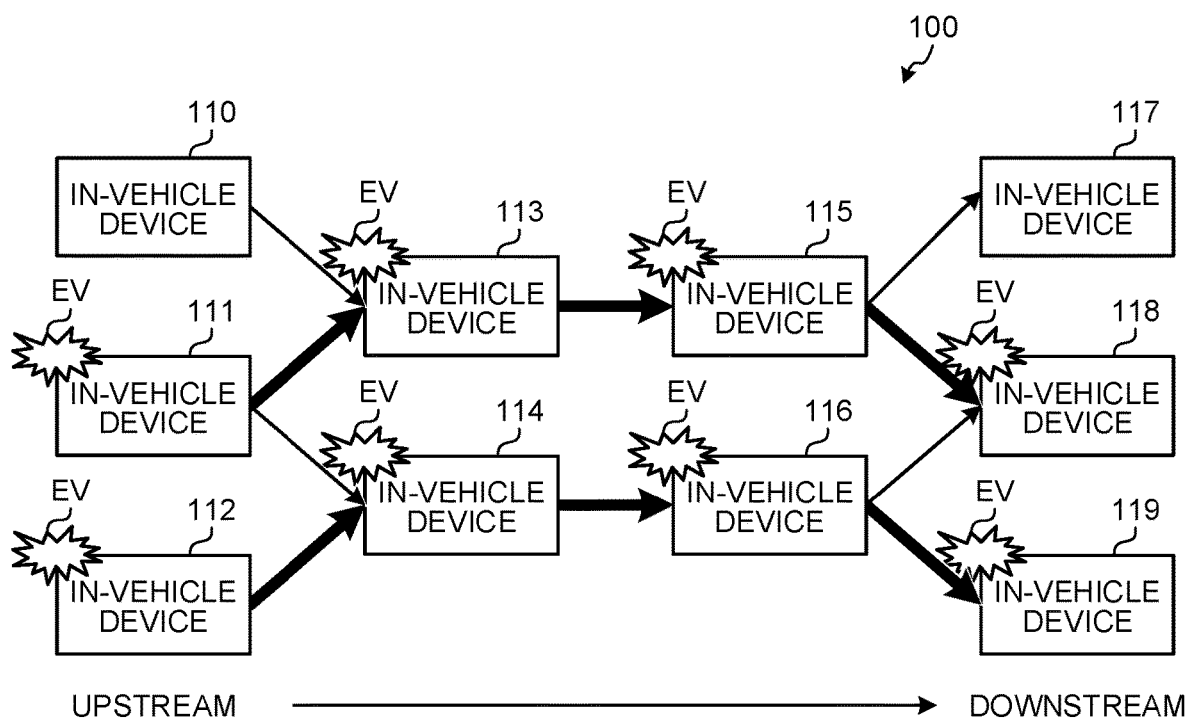
FIG. 7 is a diagram illustrating an example of a primary attack path generated by the IDM device according to the embodiment.

FIG. 7 is a diagram illustrating an example of the primary attack path generated by the IDM device 10 according to the embodiment. The primary generation unit 103 generates as many primary attack paths as possible on the basis of the data of FIG. 6 described above. In the example of FIG. 7, the primary generation unit 103 generates two attack paths.

One of these attack paths flows from the in-vehicle device 111 and reaches the in-vehicle device 118 via the in-vehicle devices 113 and 115.

Here, the in-vehicle device 111 is connected to a branching point of the network, and the event EV occurs in both of the in-vehicle devices 113 and 114 on the downstream side connected to the in-vehicle device 111. Therefore, both the possibility that the event EV that has occurred in the in-vehicle device 111 has reached the in-vehicle device 113 following the network and the possibility that the event EV has reached the in-vehicle device 114 are considered.

However, among the in-vehicle devices 111 and 112 in which the event EV seems to have occurred first, the in-vehicle device 113 is connected to only the in-vehicle device 111 in one side. Meanwhile, among the in-vehicle devices 111 and 112 in which the event EV has occurred first, the in-vehicle device 114 is connected to both the in-vehicle devices 111 and 112. Therefore, it can be said that, among the in-vehicle devices 113 and 114, the in-vehicle device 113 is connected to a point where branching and merging are less than those of the in-vehicle device 114.

In this case, the primary generation unit 103 generates, as a primary attack path, a path toward the in-vehicle device 113 connected to a point where there are fewer branches and merges.

The other attack path of the two attack paths reaches the in-vehicle device 119 from the in-vehicle device 112 via the in-vehicle devices 114 and 116.

Here, the in-vehicle device 116 is connected to a branching point of the network, and the event EV occurs in both of the in-vehicle devices 118 and 119 on the downstream side connected to the in-vehicle device 116. Therefore, both the possibility that the event EV that has occurred in the in-vehicle device 116 has reached the in-vehicle device 118 following the network and the possibility that the event EV has reached the in-vehicle device 119 are considered.

However, among the in-vehicle devices 115 and 116 in which the event EV has occurred on the upstream side of these in-vehicle devices 118 and 119, the in-vehicle device 119 is connected to only the in-vehicle device 116 on one side. Meanwhile, among the in-vehicle devices 115 and 116 on the upstream side, the in-vehicle device 118 is connected to both in-vehicle devices 115 and 116. Therefore, it can be said that, among the in-vehicle devices 118 and 119, the in-vehicle device 119 is connected to a point where branching and merging are less than those of the in-vehicle device 118.

In this case, the primary generation unit 103 generates, as a primary attack path, a path toward the in-vehicle device 119 connected to a point where there are fewer branches and merges.

Secondary Generation Example of Attack Path

Next, generation of a secondary attack path performed by the secondary generation unit 104 of the IDM device 10 will be described with reference to FIGS. 8 to 11.

The secondary generation unit 104 generates a secondary attack path for the data after the generation of the primary attack path in FIG. 7. The secondary attack path is an attack path branching from the primary attack path generated by the primary generation unit 103 or an attack path merging with the primary attack path.

At this time, the secondary generation unit 104 preferentially advances the processing from the in-vehicle devices not included in the primary attack path generated by the primary generation unit 103 among the in-vehicle devices 111 to 116, 118, and 119 in which the event EV has occurred.

At this time, the secondary generation unit 104 also selects an attack path including the in-vehicle device connected to a point where there is no branch or merge on the network or a point where there are as a few branches and merges as possible.

Figure 8:
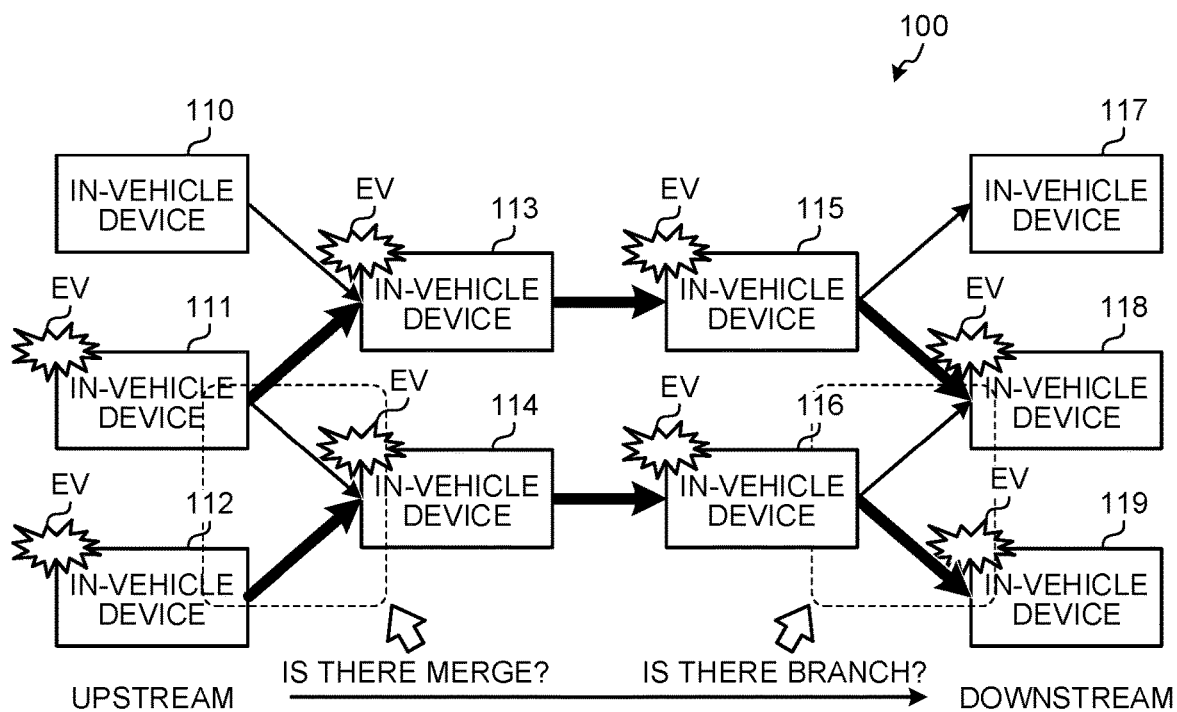
FIG. 8 is a diagram illustrating candidates in a case of generating a secondary attack path of the IDM device according to the embodiment.

FIG. 8 is a diagram illustrating candidates in a case of generating a secondary attack path of the IDM device 10 according to the embodiment. In the example of FIG. 8, when a secondary attack path is generated, two candidates can be considered.

One of the two candidates is a possibility of merging of the attack path from the in-vehicle device 111 into the primary attack path from the in-vehicle device 112 via the in-vehicle device 114.

The other of the two candidates is a possibility of an attack path in which a primary attack path from the in-vehicle device 116 to the in-vehicle device 119 branches to the in-vehicle device 118.

As described above, a point at which the number of attack paths that can be traced is not determined to be one at the time of generating the primary attack path by the primary generation unit 103 described above, that is, the in-vehicle device 114 that can serve as a merging point of the attack path, the in-vehicle device 116 that can serve as a branching point of the attack path, and the like can be candidates for generating the secondary attack path. In the generation of the secondary attack path, consideration is made focusing on such a point where the attack path is not fixed to one.

Specifically, the secondary generation unit 104 considers the possibility of merging and branching on the basis of the occurrence timing of the event EV in each of the in-vehicle devices 111 and 114 and the occurrence timing of the event EV in each of the in-vehicle devices 116 and 118.

Figure 9:
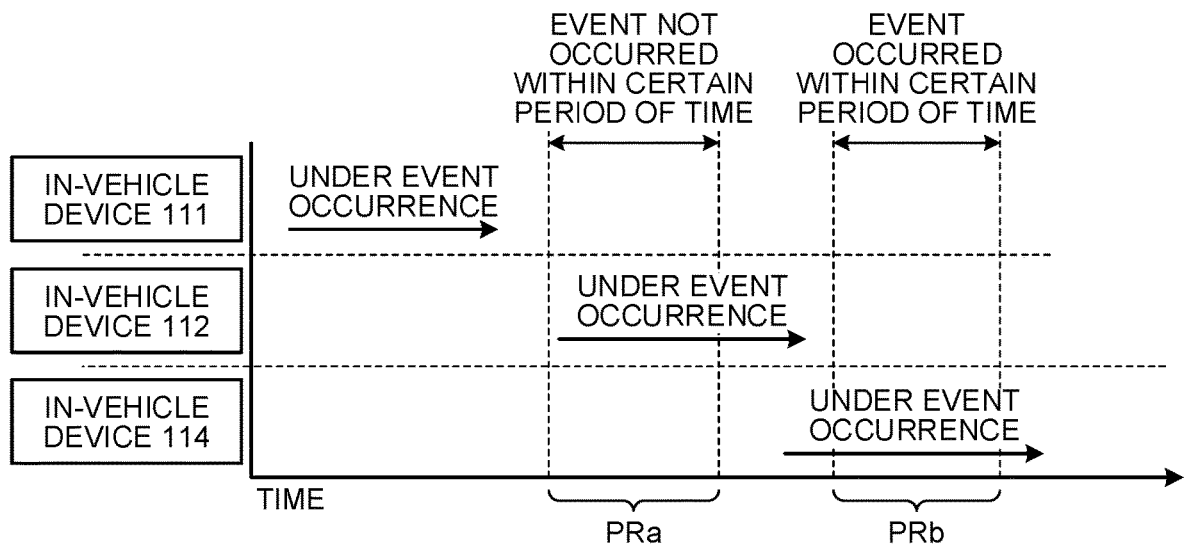
FIG. 9 is a diagram illustrating an occurrence timing of an event in each of in-vehicle devices studied in the IDM device according to the embodiment.

FIG. 9 is a diagram illustrating an occurrence timing of the event EV in each of the in-vehicle devices 111 and 114 studied in the IDM device 10 according to the embodiment. FIG. 9 also illustrates the occurrence timing of the event EV in the in-vehicle device 112 for reference.

As illustrated in FIG. 9, the events EV in the in-vehicle devices 111, 112, and 114 occur in this order. Whether or not there is a merge of the attack path from the in-vehicle device 111 to the in-vehicle device 114 is determined on the basis of whether or not the event EV occurs in the in-vehicle device 114 within a certain period of time PRa as a second period after the event EV occurs in the in-vehicle device 111.

In the example of FIG. 9, the event EV has not occurred in the in-vehicle device 114 within the certain period of time PRa from the occurrence of the event EV in the in-vehicle device 111. Therefore, the secondary generation unit 104 determines that there was no merge of the attack path from the in-vehicle device 111 to the in-vehicle device 114.

In the example of FIG. 9, the event EV occurs in the in-vehicle device 114 within a certain period of time PRb from the occurrence of the event EV in the in-vehicle device 112. Also from this point, it is estimated that there is an attack path from the in-vehicle device 112 toward the in-vehicle device 114 as generated by the primary generation unit 103.

Figure 10:
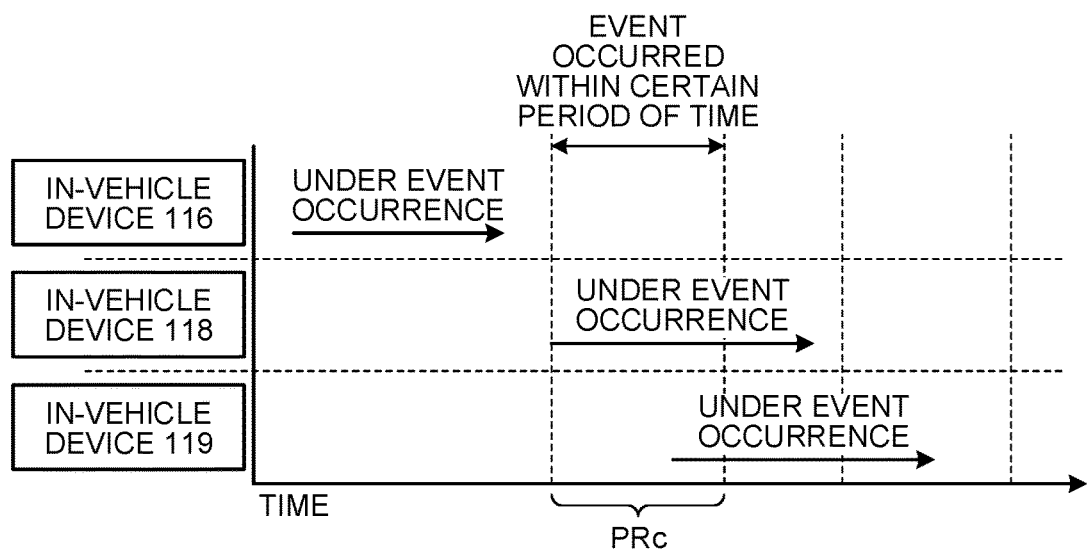
FIG. 10 is a diagram illustrating an occurrence timing of an event in each of in-vehicle devices studied in the IDM device according to the embodiment.

FIG. 10 is a diagram illustrating an occurrence timing of the event EV in each of the in-vehicle devices 116 and 118 studied in the IDM device 10 according to the embodiment. FIG. 10 also illustrates an occurrence timing of the event EV in the in-vehicle device 119 for reference.

As illustrated in FIG. 10, the events EV in the in-vehicle devices 116, 118, and 119 occur in this order. Whether or not there is a branch of the attack path from the in-vehicle device 116 to the in-vehicle device 118 is determined on the basis of whether or not the event EV has occurred in the in-vehicle device 118 within a certain period of time PRc as a first period after the occurrence of the event EV in the in-vehicle device 116.

In the example of FIG. 10, the event EV occurs in the in-vehicle device 118 within the certain period of time PRc from the occurrence of the event EV in the in-vehicle device 116. Therefore, the secondary generation unit 104 determines that there was a branch of the attack path from the in-vehicle device 116 to the in-vehicle device 118.

In the example of FIG. 10, the event EV also occurs in the in-vehicle device 119 within the certain period of time PRc from the occurrence of the event EV in the in-vehicle device 116. Also from this point, it is estimated that there is an attack path from the in-vehicle device 116 toward the in-vehicle device 119 as generated by the primary generation unit 103.

Figure 11:
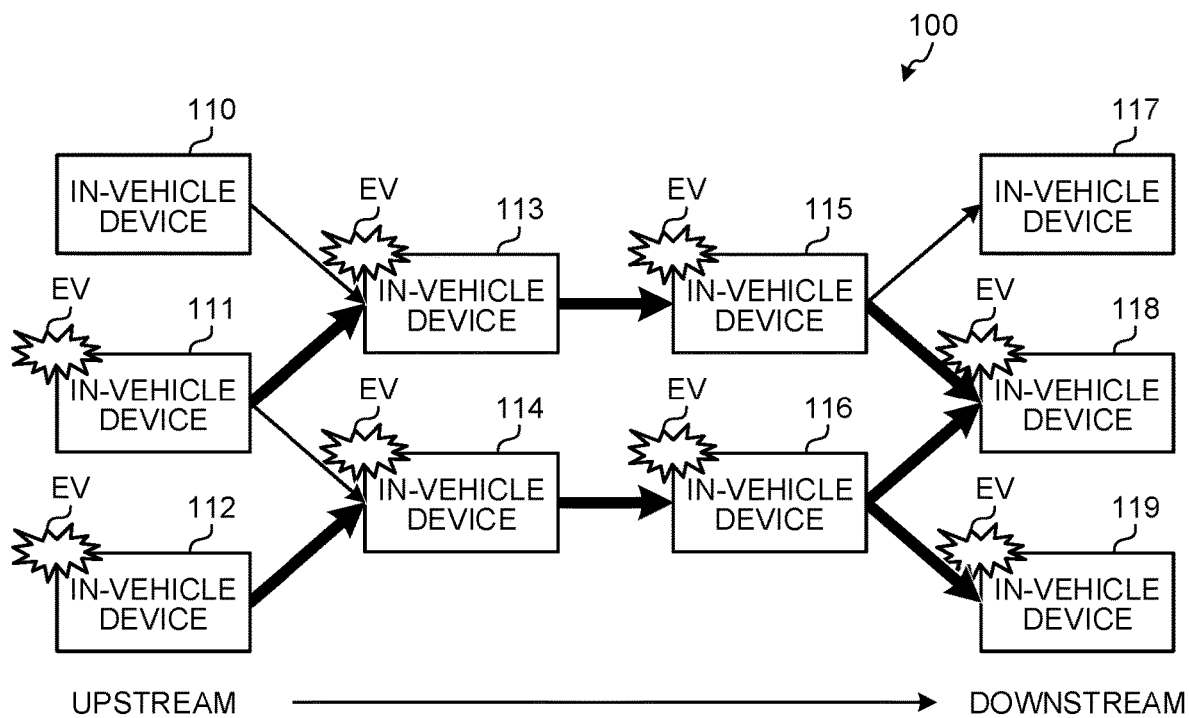
FIG. 11 is a diagram illustrating an example of an attack path generated by the IDM device according to the embodiment.

When there is a branch or a merge in the primary attack path generated by the primary generation unit 103 on the basis of the above determination result, the secondary generation unit 104 assigns those attack paths. FIG. 11 illustrates an example of data to which a secondary attack path is assigned by the secondary generation unit 104.

FIG. 11 is a diagram illustrating an example of an attack path generated by the IDM device 10 according to the embodiment. In the example of FIG. 11, the secondary attack path generated by the secondary generation unit 104 is assigned to the primary attack path generated by the primary generation unit 103.

In the example of FIG. 9 described above, it is determined that there is no merge of the attack path from the in-vehicle device 111 to the in-vehicle device 114. Therefore, a secondary attack path from the in-vehicle device 111 toward the in-vehicle device 114 is not assigned.

In the example of FIG. 10 described above, it is determined that there was a branch of the attack path from the in-vehicle device 116 leading to the in-vehicle device 118. For this reason, a secondary attack path branching from the in-vehicle device 116 to the in-vehicle device 118 is assigned to the primary attack path from the in-vehicle device 112 described above leading to the in-vehicle device 119 via the in-vehicle devices 114 and 116.

As described above, the attack path by the primary generation unit 103 and the secondary generation unit 104 is generated. The attack path processed by the primary generation unit 103 and the secondary generation unit 104 can be a secondary attack path including at least one of a branch and a merge as in the example of FIG. 11 described above, for example. Alternatively, the attack path processed by the primary generation unit 103 and the secondary generation unit 104 can be a primary attack path including neither a branch nor a merge.

The attack path generation processing by the primary generation unit 103 and the secondary generation unit 104 is performed when the event EV occurs in the in-vehicle device inside the entry point of the network.

That is, the attack path generation processing is not performed when the event EV occurs only in one device or multiple devices of the in-vehicle devices 110 to 112 as the entry point. In addition to the one device or multiple devices of the in-vehicle devices 110 to 112, when the event EV occurs in at least the one device or multiple devices of the in-vehicle devices 113 and 114 inside the network, the attack path generation processing is performed.

This is because, if the event EV occurs only on the entry point, it is not appropriate for the processing load of the IDM device 10 without assuming the attack path in the first place. Furthermore, in the cyberattack, many attack attempts are mainly made, and it is difficult to assume an attack on only the entry point.

In addition, the attack path generation processing by the primary generation unit 103 and the secondary generation unit 104 depends on the acquisition timing of the log from the IDS sensor group 100a. Therefore, the attack path generation processing may be either during the occurrence of a series of events EV in real time or after the occurrence of a series of events EV has ended.

In addition, if the attack path generation processing is performed in real time, when the event EV occurs in the in-vehicle device on the downstream side connected to the generated attack path, the generated attack path is treated as being further extended.

In addition, when the attack path generation processing is performed after the occurrence of the series of events EV has ended, and an in-vehicle device that does not belong to any of the generated attack paths remains among the in-vehicle devices in which the occurrence of the event EV has been observed, the in-vehicle device is treated as including an erroneous detection.

Example of Estimation of Attack Scenario

Next, estimation of an attack scenario performed by the estimation unit 105 of the IDM device 10 will be described with reference to FIG. 12. FIG. 12 is a diagram illustrating an example of the known attack database 107b used by the IDM device 10 according to the embodiment to estimate an attack scenario.

As illustrated in FIG. 12, the known attack database 107b retains information of a plurality of attack scenarios representing known attack patterns. As the attack pattern, the order in which the attack is started, the event EV that can occur in the in-vehicle device as the attack target, and the like in the in-vehicle device group 100 are defined. As described above, the known attack database 107b is stored, for example, in the storage unit 107 of the IDM device 10.

The estimation unit 105 reads the known attack database 107b from the storage unit 107. In addition, the estimation unit 105 extracts an attack pattern similar to the attack path generated by the primary generation unit 103 and the secondary generation unit 104 from among the plurality of attack patterns retained by the read known attack database 107b. In addition, the estimation unit 105 estimates the attack scenario of the event EV included in the logs acquired from the IDS sensor group 100a on the basis of the extracted attack pattern.

In the example of FIG. 12, the estimation unit 105 estimates that, among the plurality of attack scenarios, the attack scenario of the scenario ID3 is the attack scenario in the series of events EV described above.

Attack Path Generation Method of IDM Device

Figure 13:
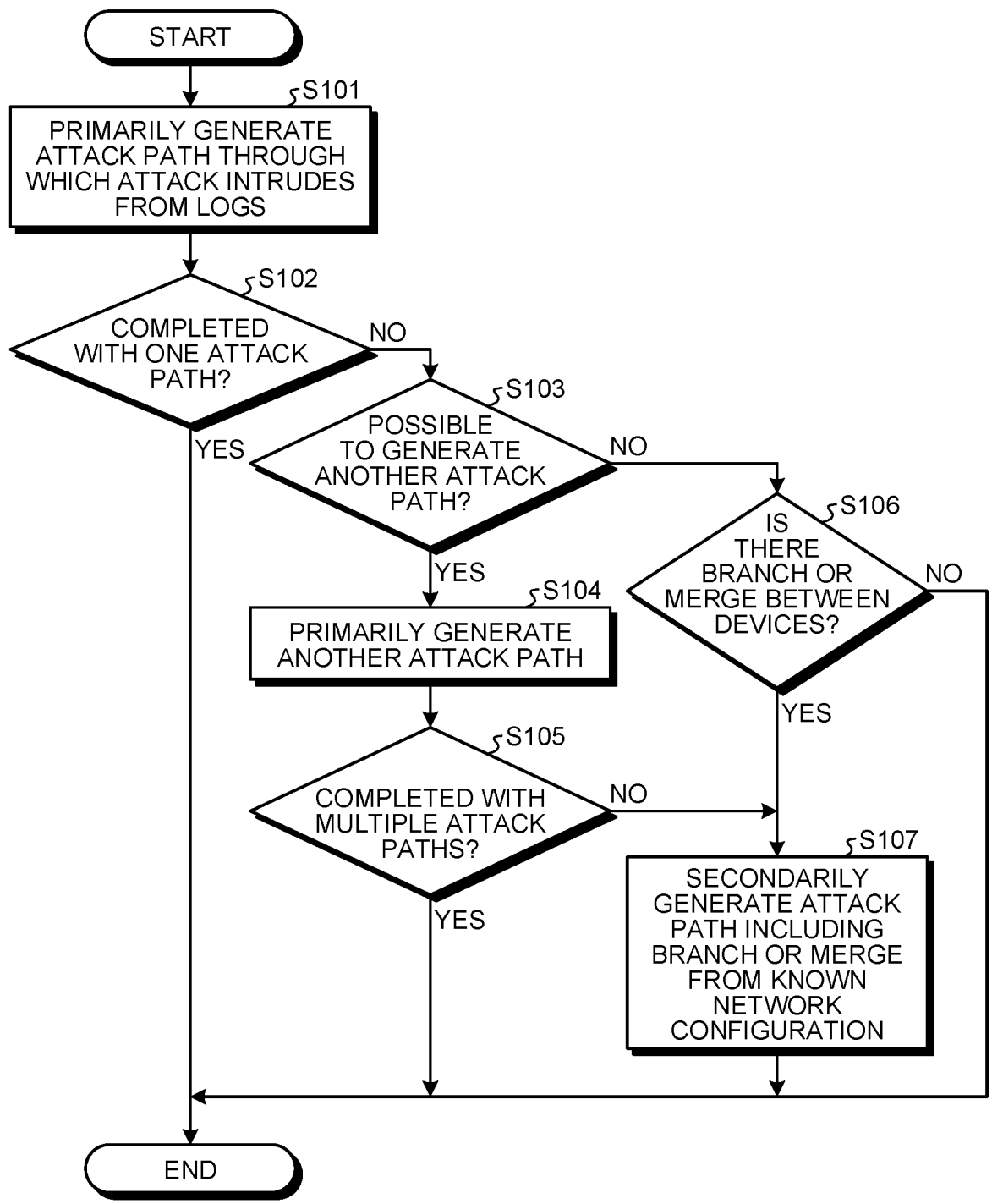
FIG. 13 is a flowchart illustrating an example of a procedure of attack path generation processing by the IDM device according to the embodiment.

Next, an example of an attack path generation method by the IDM device 10 according to the embodiment will be described with reference to FIGS. 13 and 14. FIG. 13 is a flowchart illustrating an example of a procedure of attack path generation processing by the IDM device 10 according to the embodiment.

As illustrated in FIG. 13, the primary generation unit 103 of the IDM device 10 generates a primary attack path, which is a path through which the event EV assumed to be an attack intrudes on the network, on the basis of the logs acquired from the IDS sensor group 100a (step S101).

More specifically, the data used by the primary generation unit 103 is data after being aggregated by the aggregation unit 102 and subjected to fitting processing.

After generating one primary attack path, the primary generation unit 103 determines whether or not there is no other attack path other than the one primary attack path and the generation of the attack path is completed with the one primary attack path (step S102). The fact that the generation of the attack path is completed means that all the in-vehicle devices in which the event EV assumed to be an attack has occurred are included in the generated attack path, and there is no remaining in-vehicle device. If the generation is completed with the one primary attack path (step S102: Yes), the IDM device 10 ends the processing.

If the generation is not completed with the one primary attack path (step S102: No), the primary generation unit 103 determines whether or not a primary attack path can be further generated (step S103). If another primary attack path cannot be generated (step S103: No), the process proceeds to step S106.

If another primary attack path can be generated (step S103: Yes), the primary generation unit 103 further generates a primary attack path (step S104). In addition, the primary generation unit 103 determines whether or not generation of the attack path can be completed with the plurality of primary attack paths (step S105). If the generation can be completed with these primary attack paths (step S105: Yes), the IDM device 10 ends the processing.

If the processing is not completed with the plurality of primary attack paths (step S105: No), the secondary generation unit 104 determines whether or not there is a branch or a merge at a connection point on the network of at least one of the in-vehicle devices included in the primary attack paths (step S106).

If there is no branch or merge at the connection point of any of the in-vehicle devices (step S106: No), the IDM device 10 ends the processing. In this case, the generation of the attack path ends in a state where the in-vehicle device not included in the generated attack path remains. The remaining in-vehicle device is treated as including an erroneous detection.

If there is a branch or a merge at the connection point of any of the in-vehicle devices (step S106: Yes), the secondary generation unit 104 generates a secondary attack path including at least one of the branch and the merge according to the known network (NW) configuration of the in-vehicle device group 100 (step S107).

As described above, the attack path generation processing by the IDM device 10 according to the embodiment ends.

Figure 14:
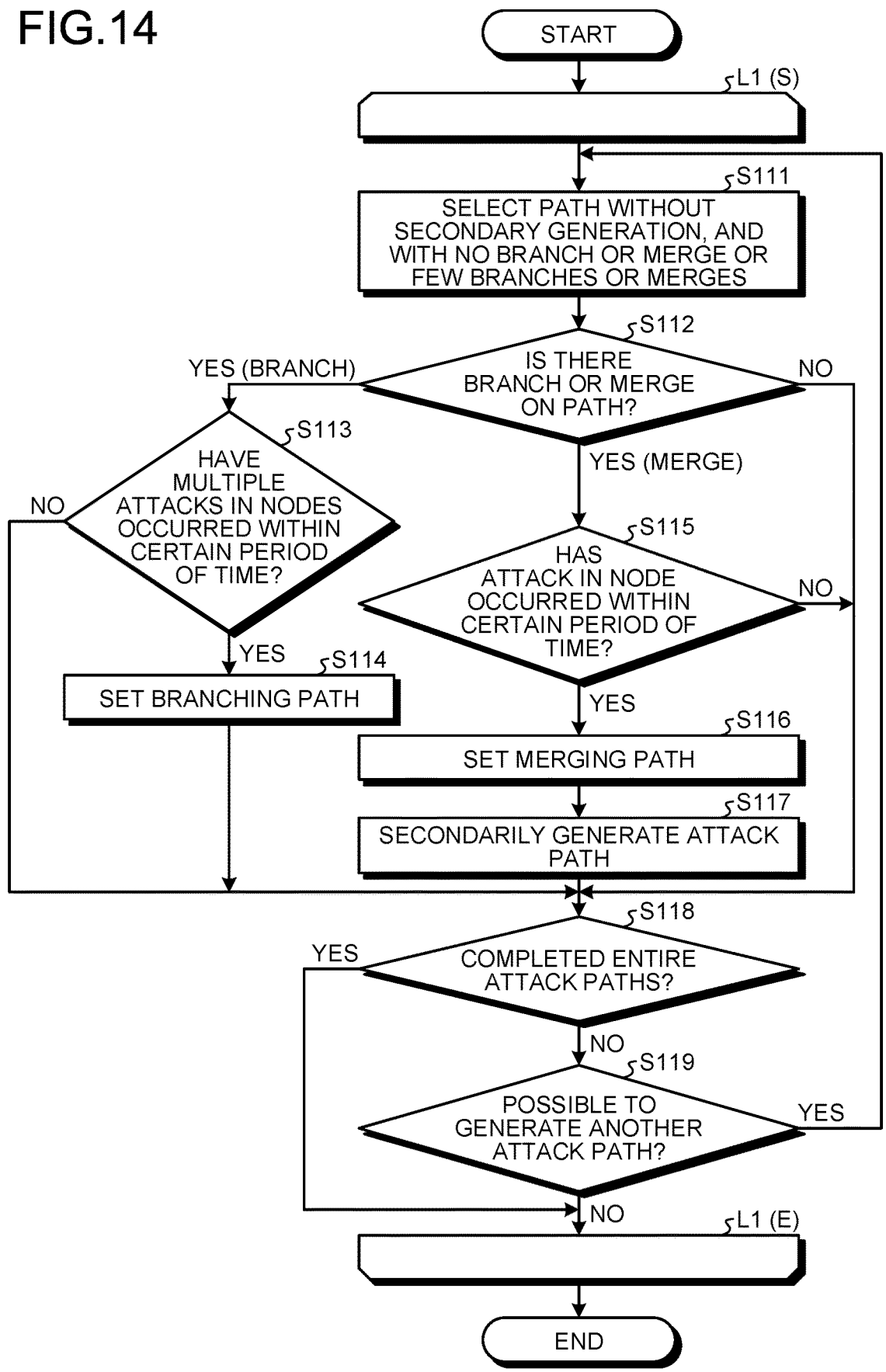
FIG. 14 is a flowchart illustrating an example of a procedure of generation processing of a secondary attack path by the IDM device according to the embodiment.

FIG. 14 is a flowchart illustrating an example of a procedure of generation processing of a secondary attack path by the IDM device 10 according to the embodiment. The processing shown in FIG. 14 is details of the process of step S107 in FIG. 13 described above.

As illustrated in FIG. 14, the secondary generation unit 104 selects, from among the primary attack paths generated by the above-described processing of the primary generation unit 103, a path for which a secondary path has not been generated and which has no branch or merge, or a few branches or merges (step S111).

The secondary generation unit 104 determines whether or not there is a branch or a merge that can generate a secondary attack path on the selected path (step S112). If there is no branch or merge (step S112: No), the secondary generation unit 104 skips the processes of steps S113 to S117 and proceeds to the process of step S118.

If there is a branch that can generate a secondary attack path on the selected path (step S112: Yes (branch)), it is determined whether or not an event EV assumed to be an attack has occurred in an in-vehicle device connected to the branching point and in an in-vehicle device connected on the downstream side of the branching point respectively within a certain period of time (step S113).

If the events EVs have occurred within the certain period of time (step S113: Yes), the secondary generation unit 104 sets a branching path between the in-vehicle devices (step S114). If the event EVs have not occurred within the certain period of time (step S113: No), the secondary generation unit 104 skips the processes of steps S114 and S117 and proceeds to the process of step S118.

If there is a merge that can generate a secondary attack path on the selected path (step S112: Yes (merge)), it is determined whether or not an event EV assumed to be an attack has occurred in an in-vehicle device connected to the merging point and in an in-vehicle device connected on the upstream side of the merging point respectively within a certain period of time (step S115).

If the event EV has occurred within the certain period of time (step S115: Yes), the secondary generation unit 104 sets a merging path between the in-vehicle devices (step S116). If the event EV has not occurred within the certain period of time (step S115: No), the secondary generation unit 104 skips the processes of steps S116 and S117 and proceeds to the process of step S118.

The secondary generation unit 104 generates a secondary attack path including a branch when there is a branching path set for the in-vehicle device connected to the branching point and the in-vehicle device connected on the downstream side of the branching point, and generates a secondary attack path including a merge when there is a merging path set for the in-vehicle device connected to the merging point and the in-vehicle device connected on the upstream side of the merging point (step S117).

In addition, the secondary generation unit 104 determines whether or not the generation of the attack path has been completed by the processes from steps S111 to S117 (step S118). If not completed with the attack paths generated so far (step S118: No), the secondary generation unit 104 determines whether or not another attack path can be generated (step S119).

If another primary attack path cannot be generated (step S119: No), the IDM device 10 ends the processing. In this case, the generation of the attack path ends in a state where the in-vehicle device not included in the generated attack path remains. The remaining in-vehicle device is treated as including an erroneous detection.

If another primary attack path can be generated (step S119: Yes), the processes from steps S111 to S119 in the loops L1(S) to L1(E) are repeated until the generation of the attack path is completed. When the generation of the attack path is completed (step S118: Yes), the processing of the loops L1(S) to L1(E) ends.

As described above, the secondary attack path generation processing by the IDM device 10 according to the embodiment ends.

Thereafter, the output unit 106 outputs the estimation result of the attack scenario by the estimation unit 105 and the generation result of attack paths generated by the primary generation unit 103 and the secondary generation unit 104 to the SIEM device 21.

The attack determination unit 201 and the attack handling unit 202 of the SIEM device 21 perform the attack determination of the event EV detected by the IDS sensor group 100a and the countermeasure planning on the basis of the generation result of the attack paths and the estimation result of the attack scenario. Examples of countermeasures against the event EV include interruption of communication or a network in a specific in-vehicle device, update of software, and stop of a system including the in-vehicle device group 100.

Comparative Example

With the advancement of cyberattacks, it is becoming difficult to completely defend cyberattacks, and countermeasures after the occurrence of cyberattacks are important. In addition, in a control system of an in-vehicle device group or the like, security measures may not be perfect, and malfunction or destruction of a device may occur in a very short time after the occurrence of an attack.

For example, JP 6831763 B2 described above discloses a technique in which, when a plurality of attack scenarios match a log, a table in which an attack path and the number of times of handling are associated is referred to, and one attack path is specified on the basis of priority according to the number of times of handling even when a plurality of estimated attacks were found.

However, in a case where a plurality of nodes are simultaneously attacked and a plurality of attack paths are generated as in a reconnaissance action in a cyberattack, it is difficult to take a sufficient response by the above-described technique assuming one attack path in one attack.

On the other hand, even when a plurality of attack paths are generated, if the attack path is a primary attack path having neither a branch nor a merge, it is considered that a plurality of attack paths can be specified by repeatedly implementing the above technique. However, if a plurality of attack paths are generated and include attack paths having a branch or a merge, the above technique still provides an insufficient response.

With the IDM device 10 of the embodiment, a primary attack path without a branch and a merge is generated on the basis of the logs in the in-vehicle device group 100 having an attack detection function, and a secondary attack path branching from the primary attack path or merging with the primary attack path is generated. This makes it possible to specify the attack path even when a plurality of devices are simultaneously attacked.

With the IDM device 10 of the embodiment, the secondary attack path includes an in-vehicle device included in the primary attack path and on the upstream side or the downstream side in which the event EV assumed to be an attack occurs within a certain period of time from the event EV assumed to be an attack on the in-vehicle device connected to the merging point or the branching point of the network. As a result, it is possible to determine the presence or absence of a secondary attack path accompanying the primary attack path, and it is possible to appropriately generate an attack path including the secondary attack path.

With the IDM device 10 of the embodiment, when the event EV for the in-vehicle device 116 included in the primary attack path in the in-vehicle device group 100 and connected to the branching point of the network and the event EV for the in-vehicle device 118 not included in the primary attack path to which the in-vehicle device 116 belongs in the two or more in-vehicle devices 118 and 119 connected to the branch destination of the network occur within a certain period of time, a path branching from the primary attack path to the in-vehicle device 118 is generated. As a result, it is possible to determine the presence or absence of an attack path branching from the primary attack path, and it is possible to appropriately generate an attack path including the branching.

With the IDM device 10 of the embodiment, when the event EV for the in-vehicle device 114 included in the primary attack path in the in-vehicle device group 100 and connected to the merging point of the network and the event EV for the in-vehicle device 112 not included in the primary attack path to which the in-vehicle device 114 belongs in the two or more in-vehicle devices 111 and 112 connected to the merging point on the upstream side of the in-vehicle device 114 occur within a certain period of time, a path merging with the primary attack path from the in-vehicle device 111 on the upstream side is generated. As a result, it is possible to determine the presence or absence of an attack path merging with the primary attack path, and it is possible to appropriately generate an attack path including the merging.

With to the IDM device 10 of the embodiment, an attack scenario in an event EV assumed to be an attack is estimated on the basis of a known attack scenario. As a result, it is possible to further increase the added value of the information output to the SIEM device 21.

In the above-described embodiment, the IDM device 10 includes the estimation unit 105, and the estimation unit 105 estimates the attack scenario in the event EV assumed to be an attack. However, the estimation of the attack scenario may be implemented, for example, in the SIEM device 21.

Modification 1

Next, an IDM device 210 according to Modification 1 of the embodiment will be described with reference to FIGS. 15 to 19. The IDM device 210 of the modification is different from the above-described embodiment in that a plurality of in-vehicle devices included in a generated attack path is treated as a group when generating a secondary attack path.

Figure 15:
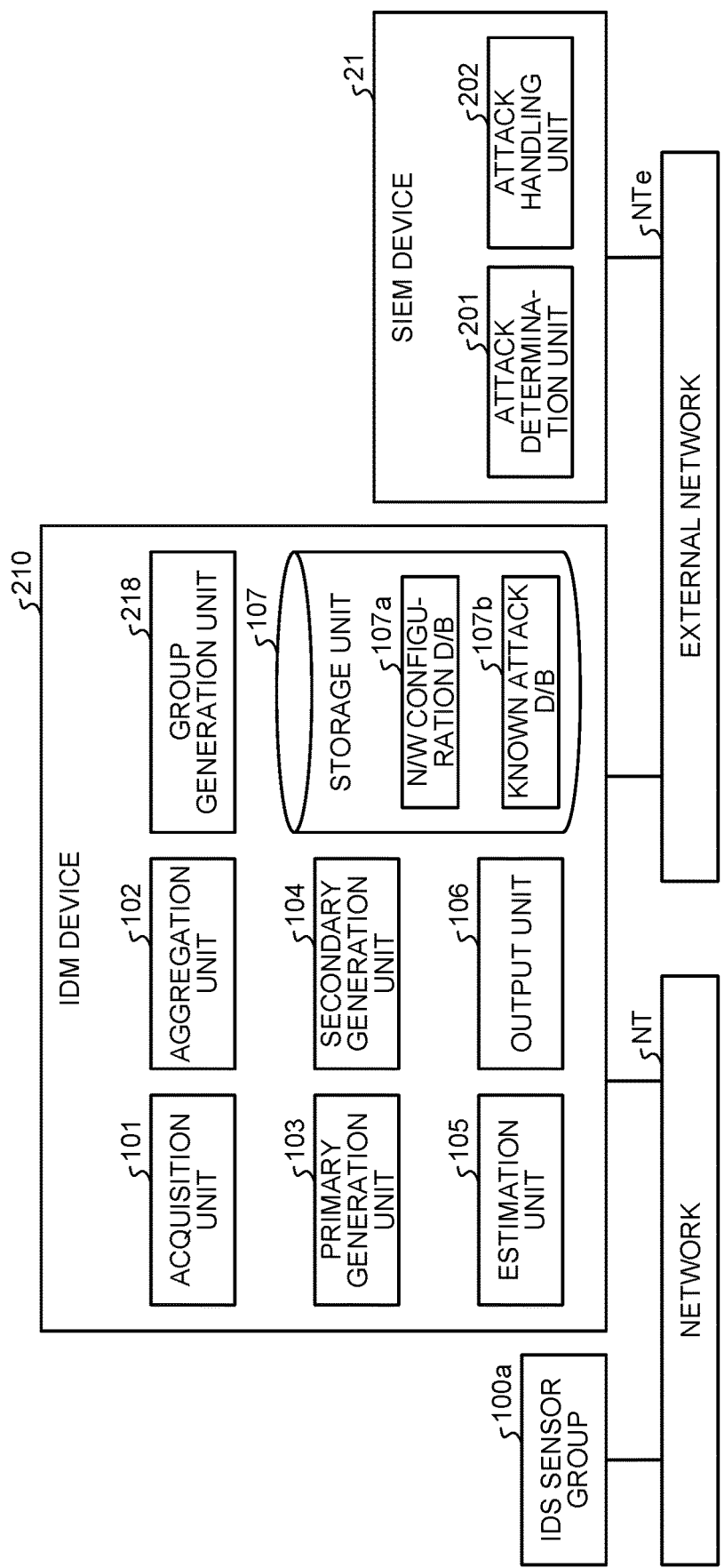
FIG. 15 is a block diagram illustrating an example of functional configurations of an IDM device and a SIEM device according to Modification 1 of the embodiment.

FIG. 15 is a block diagram illustrating an example of functional configurations of the IDM device 210 and the SIEM device 21 according to Modification 1 of the embodiment. In FIG. 15, the same reference numerals are given to the same configurations as those of the above-described embodiment, and the description thereof will be omitted.

As illustrated in FIG. 15, the IDM device 210 of Modification 1 includes a group generation unit 218 in addition to the configuration of the IDM device 10 of the above-described embodiment. The group generation unit 218 groups several in-vehicle devices included in the generated attack path. The group generation unit 218 is implemented by, for example, a CPU of the IDM device 210 executing the attack path generation program.

Figure 16:
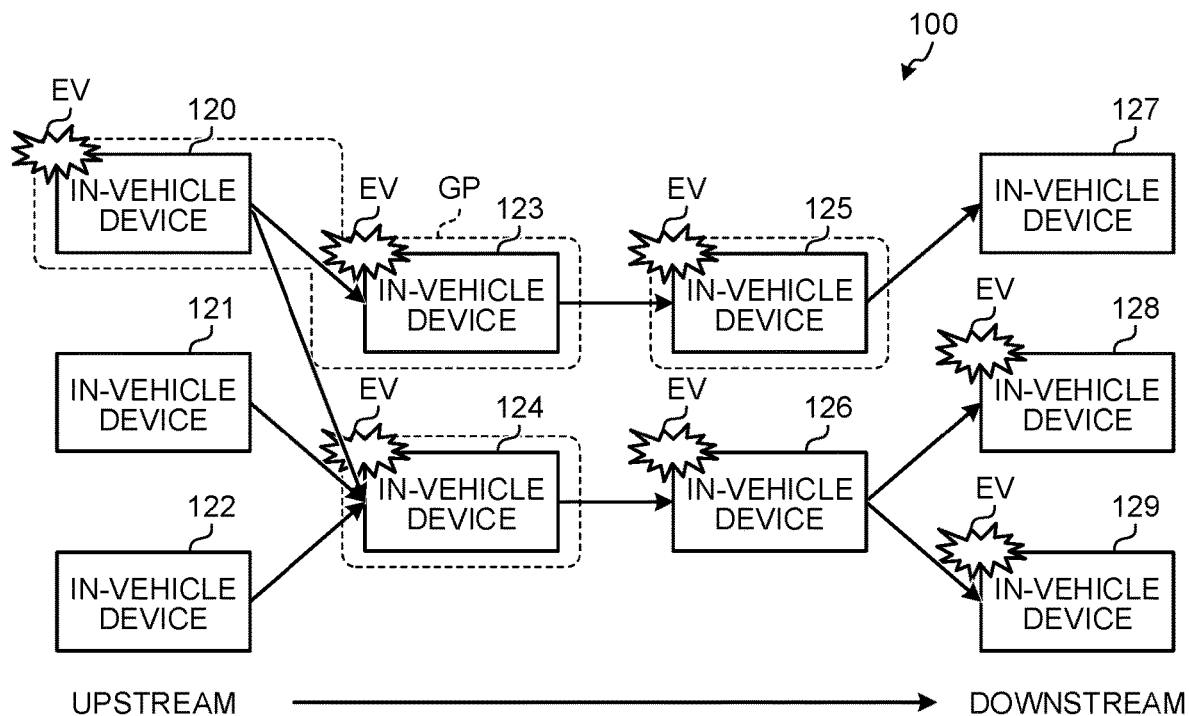
FIG. 16 is a diagram illustrating an example of data obtained by performing fitting processing on a log acquired from an IDS sensor group by the IDM device according to Modification 1 of the embodiment.

FIG. 16 is a diagram illustrating an example of data obtained by the IDM device 210 according to Modification 1 of the embodiment performing the fitting processing on the logs acquired from the IDS sensor group.

In the example of FIG. 16, the in-vehicle device group 100 mounted on the vehicle includes in-vehicle devices 120 to 129. The network configuration of the in-vehicle devices 120 to 129 is different from the network configuration of the in-vehicle devices 110 to 119 of the above-described embodiment.

Furthermore, in the example of FIG. 16, it is assumed that an event EV assumed to be an attack on the in-vehicle devices 120, 123 to 126, 128, and 129 has occurred among the in-vehicle devices 120 to 129.

First, the primary generation unit 103 generates a primary attack path from the in-vehicle device 120 to the in-vehicle device 123. The group generation unit 218 generates a group GP obtained by grouping the in-vehicle devices 120 and 123.

When the secondary generation unit 104 examines the presence or absence of a branch or a merge in the primary attack path to which the in-vehicle devices 120 and 123 belong, the primary attack path to which the in-vehicle devices 120 and 123 belong is handled in units of groups. In the example of FIG. 16, for example, it can be seen that the in-vehicle device 125 is connected to the group GP on the downstream side of the group GP. Furthermore, for example, it can be seen that the in-vehicle device 124 branches from the group GP.

The secondary generation unit 104 considers the possibility of branching of the attack path from the group GP to the in-vehicle device 124 on the downstream side of the group GP. At this time, the secondary generation unit 104 determines the presence or absence of the branching from the group GP to the in-vehicle device 124 on the basis of the occurrence timing of the event EV in the in-vehicle device 124 branching from the group GP and the in-vehicle device 125 connected to the group GP on the downstream side.

Figure 17:
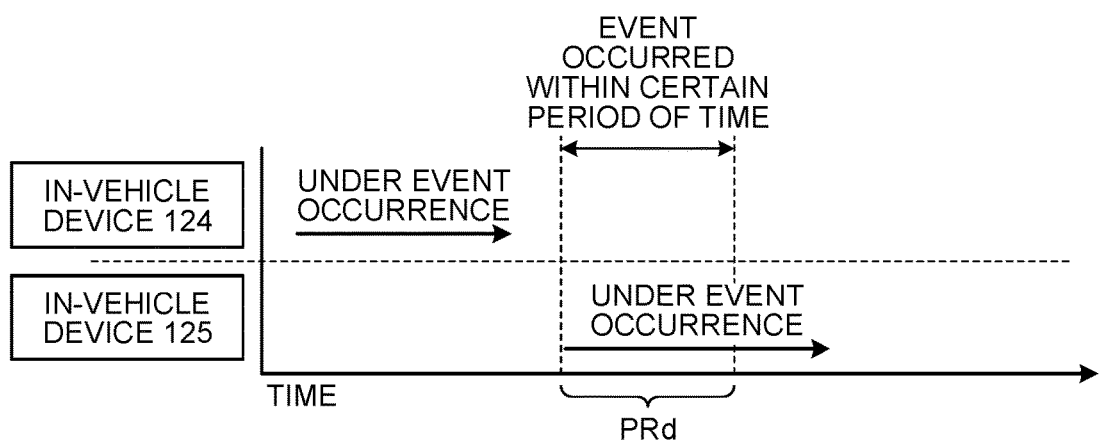
FIG. 17 is a diagram illustrating an occurrence timing of an event in each of in-vehicle devices studied in the IDM device according to Modification 1 of the embodiment.

FIG. 17 is a diagram illustrating an occurrence timing of each event EV in the in-vehicle device 124 and in the in-vehicle device 125 studied in the IDM device 210 according to Modification 1 of the embodiment.

As illustrated in FIG. 17, the events EV in the in-vehicle device 124 and 125 occur in this order. Whether or not there is a branch of the attack path from the group GP to the in-vehicle device 124 is determined on the basis of whether or not both the event EV in the in-vehicle device 124 and the event EV in the in-vehicle device 125 occur within a certain period of time PRd as a fourth period.

In the example of FIG. 17, both the event EV in the in-vehicle device 124 and the event EV in the in-vehicle device 125 occur within the certain period of time PRd. Therefore, the secondary generation unit 104 determines that there was branching of the attack path from the group GP to the in-vehicle device 124.

Even when the secondary generation unit 104 considers merging with the primary attack path generated by the primary generation unit 103, the plurality of in-vehicle devices included in the primary attack path is handled in units of groups as described above.

Figure 18:
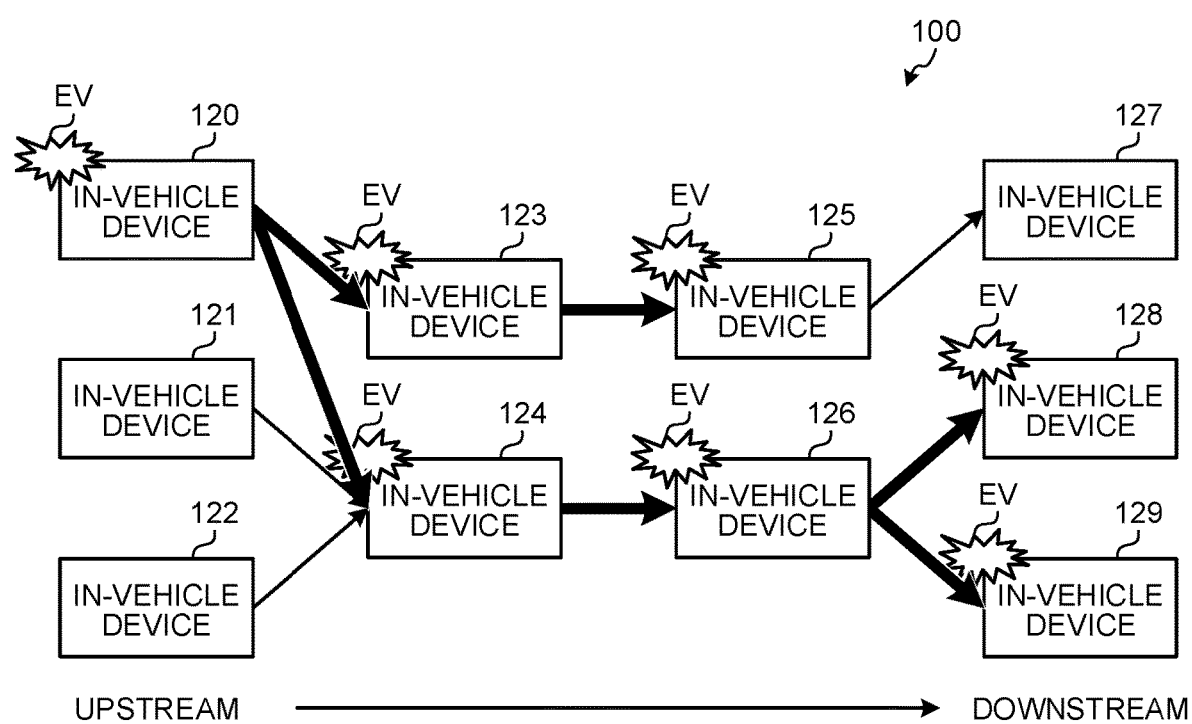
FIG. 18 is a diagram illustrating an example of an attack path generated by the IDM device according to Modification 1 of the embodiment.

FIG. 18 illustrates an example of an attack path generated by the IDM device 210 of Modification 1. FIG. 18 is a diagram illustrating an example of an attack path generated by the IDM device 210 according to Modification 1 of the embodiment. In the example of FIG. 18, an attack path branching from the primary attack path generated by the primary generation unit 103 is assigned by the secondary generation unit 104.

That is, in the example of FIG. 18, the primary generation unit 103 generates a primary attack path from the in-vehicle device 120 leading to the in-vehicle device 125 via the in-vehicle device 123. In addition, the secondary generation unit 104 generates a secondary attack path branching from the in-vehicle device 120 to the in-vehicle device 124.

In this secondary attack path, a primary attack path from the in-vehicle device 124 to any one of the in-vehicle devices 128 and 129 via the in-vehicle device 126 is further generated by the primary generation unit 103. The secondary attack path branching to one of the in-vehicle devices 128 and 129 is further provided by the secondary generation unit 104.

Figure 19:
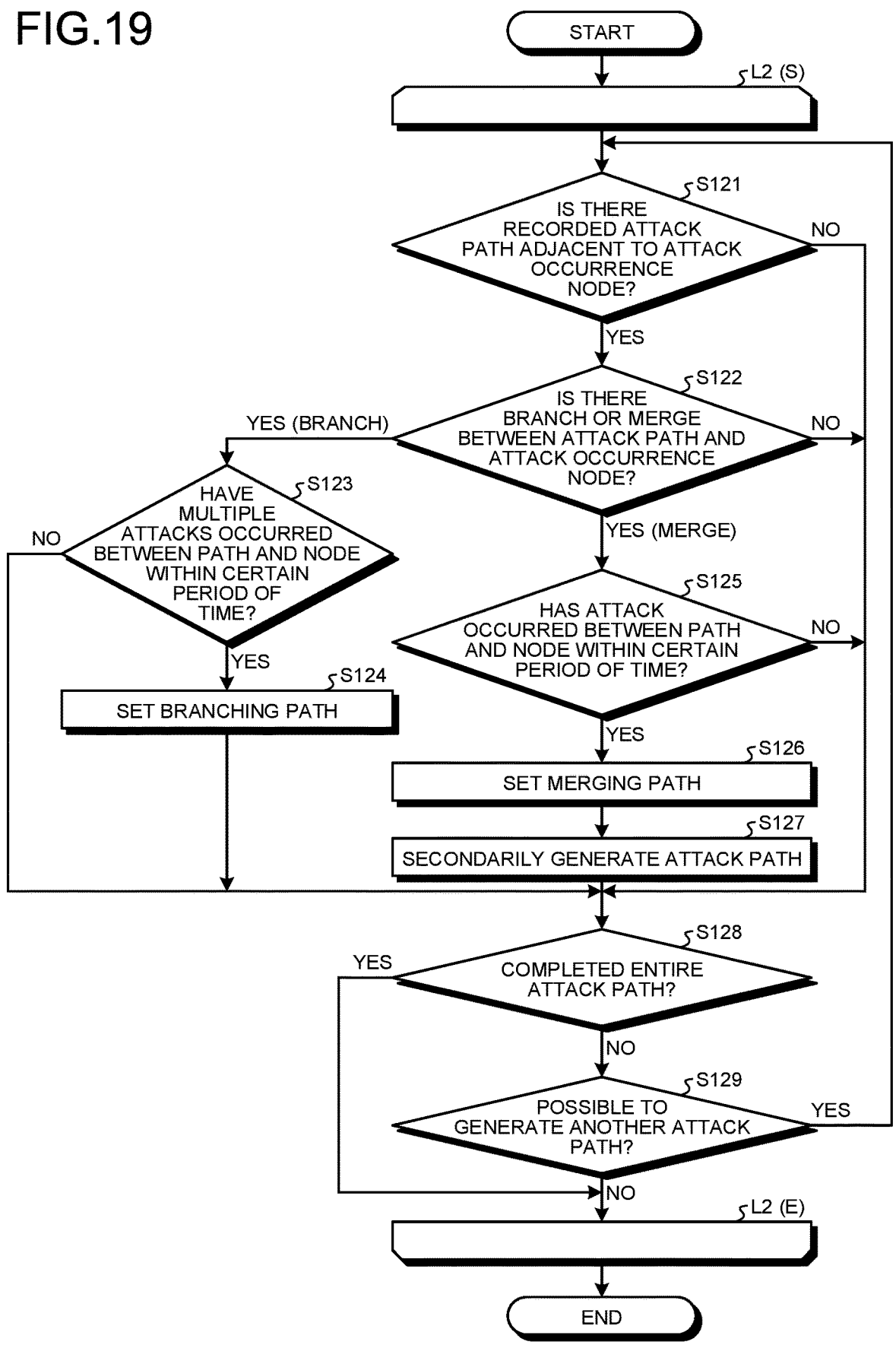
FIG. 19 is a flowchart illustrating an example of a procedure of generation processing of a secondary attack path by the IDM device according to Modification 1 of the embodiment.

Next, an example of a method of generating a secondary attack path by the IDM device 210 of Modification 1 will be described with reference to FIG. 19. FIG. 19 is a flowchart illustrating an example of a procedure of generation processing of a secondary attack path by the IDM device 210 according to Modification 1 of the embodiment.

In the secondary attack path generation processing of the above-described embodiment, the branching or merging for the respective in-vehicle devices has been considered. On the other hand, in the secondary attack path generation processing of Modification 1, branching or merging of a predetermined in-vehicle device with respect to a plurality of grouped in-vehicle devices is considered. In other words, the processes of steps S122 to S126 illustrated in FIG. 19 correspond to the processes of steps S112 to S116 illustrated in FIG. 13 of the above-described embodiment.

As illustrated in FIG. 19, the secondary generation unit 104 determines whether or not there is a generated attack path adjacent to the predetermined in-vehicle device in which the event EV assumed to be an attack has occurred (step S121). If there is no adjacent attack path (step S121: No), the secondary generation unit 104 skips the processes of steps S122 to S127 and proceeds to the process of step S128.

If there is an adjacent attack path (step S121: Yes), the secondary generation unit 104 treats the attack path in units of groups, and determines whether or not there is a branch or a merge that can generate a secondary attack path between the attack path and the above-described in-vehicle device adjacent thereto (step S122).

If there is no branch or merge (step S122: No), the secondary generation unit 104 skips the processes of steps S123 to S127 and proceeds to the process of step S128.

If there is a branch that can generate a secondary attack path between the attack path and the above-described in-vehicle device adjacent thereto (step S122: Yes (branch)), the secondary generation unit 104 determines whether or not an event EV assumed to be an attack in the in-vehicle device connected to the attack path on the downstream side and the above-described in-vehicle device adjacent to the attack path has occurred within a certain period of time (step S123).

If the event EV has occurred within the certain period of time (step S123: Yes), the secondary generation unit 104 sets a branching path between the attack path and the in-vehicle device (step S124). If the event EV has not occurred within the certain period of time (step S123: No), the secondary generation unit 104 skips the processes of steps S124 and S127 and proceeds to the process of step S128.

If there is a merge that can generate a secondary attack path between the attack path and the above-described in-vehicle device adjacent thereto (step S122: Yes (merge)), the secondary generation unit 104 determines whether or not an event EV assumed to be an attack in the in-vehicle device connected to the attack path on the upstream side and the above-described in-vehicle device adjacent to the attack path has occurred within a certain period of time (step S125).

If the event EV has occurred within the certain period of time (step S125: Yes), the secondary generation unit 104 sets a merging path between the attack path and the in-vehicle device (step S126). If the event EV has not occurred within the certain period of time (step S125: No), the secondary generation unit 104 skips the processes of steps S126 and S127 and proceeds to the process of step S128.

When there is a branching path set between the attack path and the above-described in-vehicle device adjacent to the attack path, the secondary generation unit 104 generates a secondary attack path including the branching, and when there is a merging path set between the attack path and the above-described in-vehicle device adjacent to the attack path, the secondary generation unit generates a secondary attack path including the merging (step S127).

In addition, the secondary generation unit 104 determines whether or not the generation of the attack path has been completed by the processes from steps S121 to S127 (step S128). When the generation is not completed with the attack path generated so far (step S128: No), the secondary generation unit 104 determines whether or not another attack path can be generated (step S129).

If another primary attack path cannot be generated (step S129: No), the IDM device 210 ends the processing. In this case, the generation of the attack path ends in a state where the in-vehicle device not included in the generated attack path remains. The remaining in-vehicle device is treated as including an erroneous detection.

If another primary attack path can be generated (step S129: Yes), the processes from steps S121 to S129 in the loops L2(S) to L2(E) are repeated until the generation of the attack path is completed. When the generation of the attack path is completed (step S128: Yes), the processing of the loops L2(S) to L2(E) ends.

As described above, the secondary attack path generation processing by the IDM device 210 according to Modification 1 ends.

With the IDM device 210 of Modification 1, if an attack on the in-vehicle device 124 on the branching path associated with the group GP and an attack on the in-vehicle device 125 connected to the group GP on the downstream side occur within a certain period of time in the in-vehicle device group 100, a path branching from the group GP to the in-vehicle device 124 is generated. As a result, the possibility of the attack target can be studied more widely.

Modification 2

Next, an IDM device 310 according to Modification 2 of the embodiment will be described with reference to FIGS. 20 to 23. The IDM device 310 of Modification 2 is different from the above-described embodiment in counting the number of occurrences of the event EV.

Figure 20:
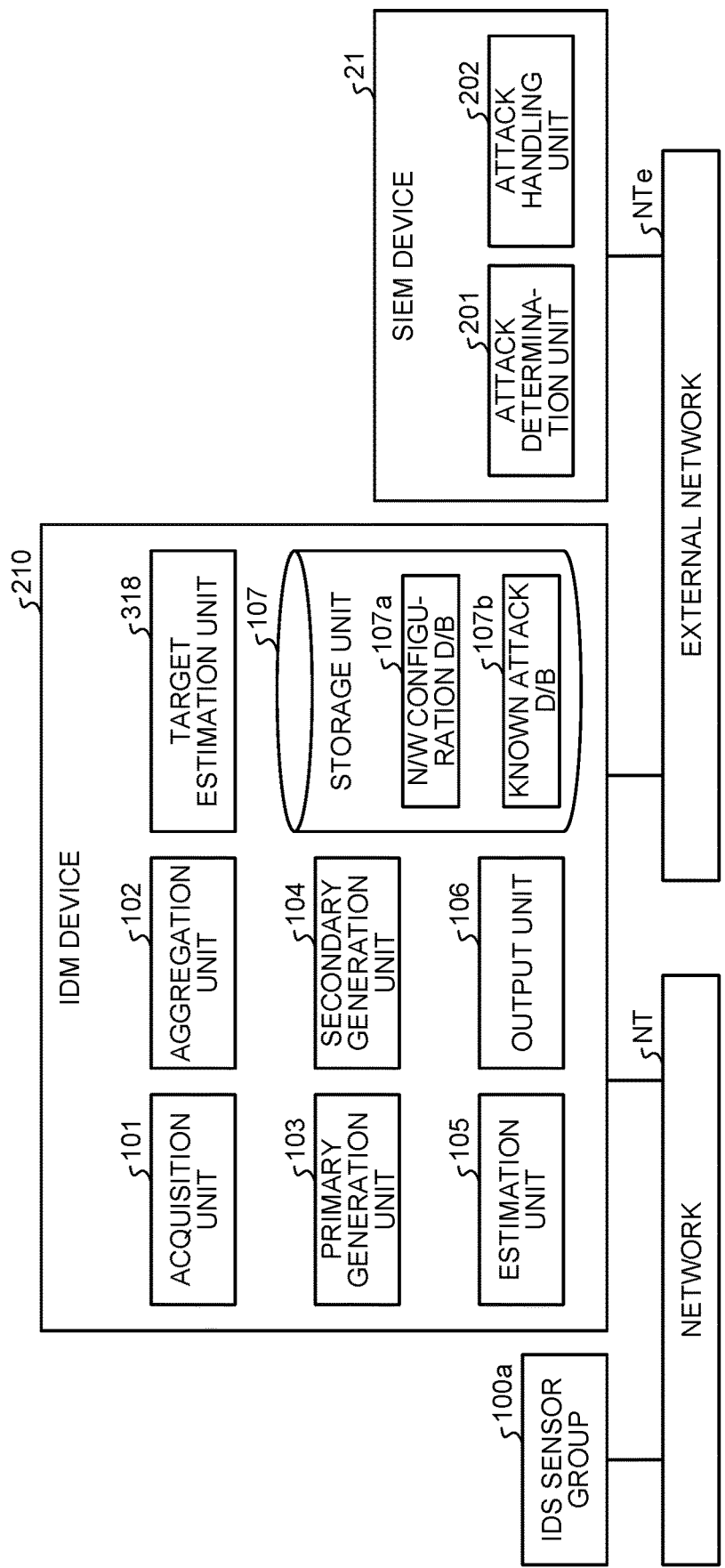
FIG. 20 is a block diagram illustrating an example of functional configurations of an IDM device and a SIEM device according to Modification 2 of the embodiment.

FIG. 20 is a block diagram illustrating an example of functional configurations of the IDM device 310 and the SIEM device 21 according to Modification 2 of the embodiment. In FIG. 20, the same reference numerals are given to the same configurations as those of the above-described embodiment, and the description thereof will be omitted.

As illustrated in FIG. 20, the IDM device 310 of Modification 2 includes a target estimation unit 318 in addition to the configuration of the IDM device 10 of the above-described embodiment.

The target estimation unit 318 counts the number of occurrences of the event EV within a certain period of time in the data obtained by performing the fitting processing on the logs acquired from the IDS sensor group. In addition, the target estimation unit 318 estimates that one or more in-vehicle devices connected to the downstream side of the in-vehicle device at the branch destination at which the number of occurrences of the event EV is the largest among the plurality of branch destinations in the attack path are attack targets. The target estimation unit 318 is implemented by, for example, the CPU of the IDM device 310 executing the attack path generation program.

Figure 21:
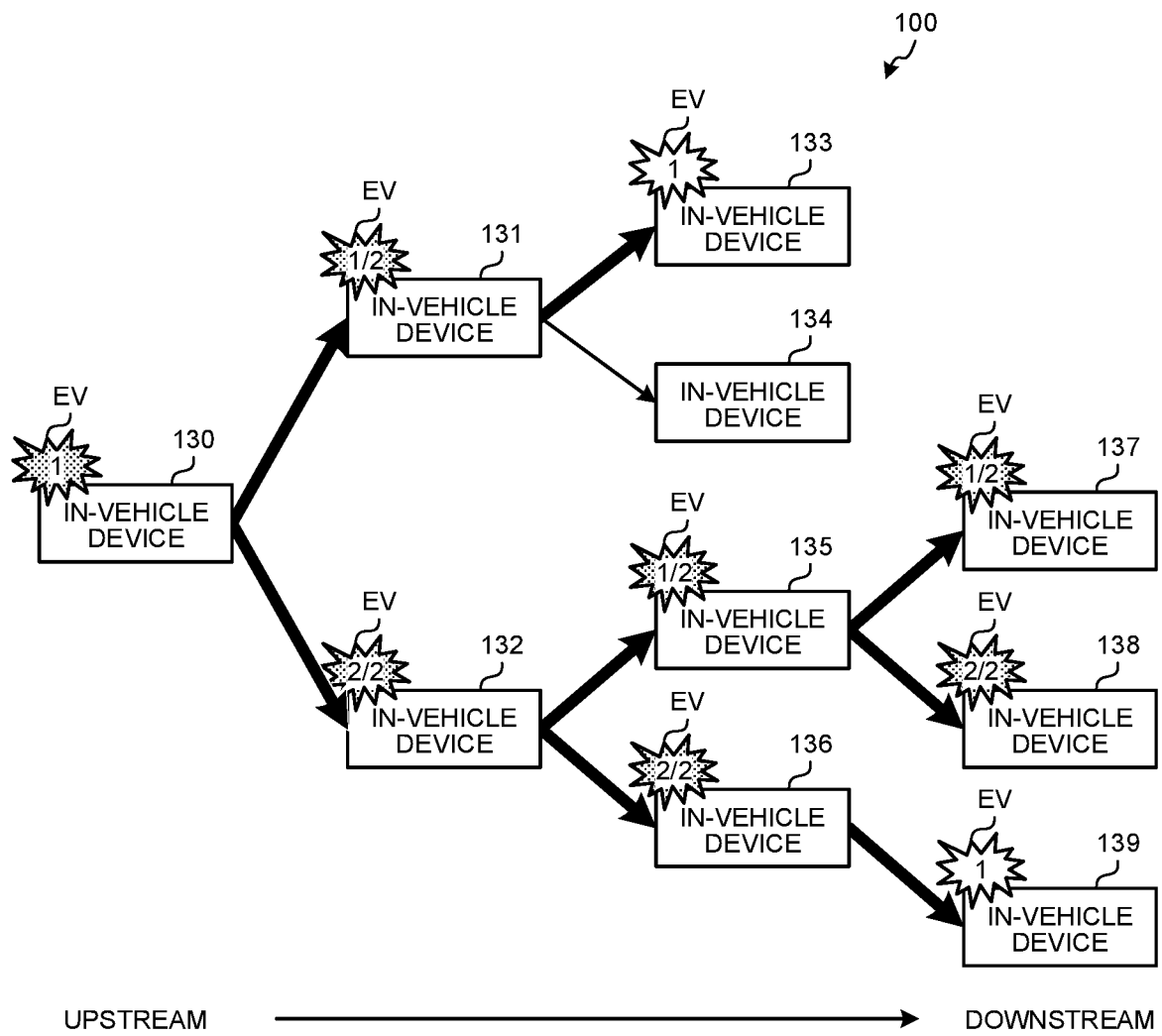
FIG. 21 is a diagram illustrating an example of an attack path generated by the IDM device according to Modification 2 of the embodiment.

FIG. 21 is a diagram illustrating an example of an attack path generated by the IDM device 310 according to Modification 2 of the embodiment.

In the example of FIG. 21, the in-vehicle device group 100 mounted on the vehicle includes in-vehicle devices 130 to 139. The network configuration of the in-vehicle devices 130 to 139 is different from the network configuration of the in-vehicle devices 110 to 119 of the above-described embodiment.

Furthermore, in the example of FIG. 21, it is assumed that an event EV assumed to be an attack on the in-vehicle devices 130 to 133, and 135 to 139 has occurred among the in-vehicle devices 130 to 139.

The primary generation unit 103 generates an attack path on the basis of the data after the fitting. As a result, a primary attack path from the in-vehicle device 130 leading to the in-vehicle device 133 via the in-vehicle device 131 is generated. Further, a primary attack path from the in-vehicle device 130 leading to the in-vehicle device 137 via the in-vehicle devices 132 and 135 is generated.

Further, the secondary generation unit 104 generates a secondary attack path branching from the in-vehicle device 135 to the in-vehicle device 138. In addition, a secondary attack path branching from the in-vehicle device 132 to the in-vehicle device 136 and reaching the in-vehicle device 139 is generated.

Meanwhile, the target estimation unit 318 counts the number of occurrences of the event EV within a certain period of time, which is a third period, as the number of attack occurrences for the in-vehicle devices 130 to 139.

In the example of FIG. 21, it is assumed that the event EV in the in-vehicle devices 131 and 132 has occurred within a certain period of time. In this case, for example, the target estimation unit 318 counts the number of attack occurrences in the in-vehicle device 131 as the first in two, that is, 1/2. In addition, for example, the target estimation unit 318 counts the number of attack occurrences in the in-vehicle device 132 as the second in two, that is, 2/2.

In the example of FIG. 21, it is assumed that there is no other in-vehicle device in which the event EV has occurred within a certain period of time after the occurrence of the event EV in the in-vehicle device 133. In this case, for example, the target estimation unit 318 counts the number of attack occurrences in the in-vehicle device 133 as one.

In the example of FIG. 21, it is assumed that the event EV in the in-vehicle devices 135 and 136 has occurred within a certain period of time. In this case, for example, the target estimation unit 318 counts the number of attack occurrences in the in-vehicle device 135 as the first in two, that is, 1/2. In addition, for example, the target estimation unit 318 counts the number of attack occurrences in the in-vehicle device 136 as the second in two, that is, 2/2.

In the example of FIG. 21, it is assumed that the event EV in the in-vehicle devices 137 and 138 has occurred within a certain period of time. In this case, for example, the target estimation unit 318 counts the number of attack occurrences in the in-vehicle device 137 as the first in two, that is, 1/2. In addition, for example, the target estimation unit 318 counts the number of attack occurrences in the in-vehicle device 138 as the second in two, that is, 2/2.

In the example of FIG. 21, it is assumed that there is no other in-vehicle device in which the event EV has occurred within a certain period of time after the occurrence of the event EV in the in-vehicle device 139. In this case, for example, the target estimation unit 318 counts the number of attack occurrences in the in-vehicle device 139 as one.

After counting the number of attack occurrences for each of the in-vehicle devices 130 to 139, the target estimation unit 318 specifies the in-vehicle device as the attack target on the basis of the count of the number of attack occurrences.

Specifically, in the attack path starting from the in-vehicle device 130, there are branches of a path toward the in-vehicle devices 131 and 133 and a path toward the in-vehicle devices 132, 135, and 136. In this case, the target estimation unit 318 compares the number of attack occurrences between the branch destination including the in-vehicle devices 131 and 133 and the branch destination including the in-vehicle devices 132, 135, and 136 among the plurality of branch destinations from the in-vehicle device 130.

In the example of FIG. 21, the number of attack occurrences in the in-vehicle device 133 is 1 at the branch destination including the in-vehicle devices 131 and 133. In addition, the number of attack occurrences in the in-vehicle devices 135 and 136 is 2 at the branch destination including the in-vehicle devices 132, 135, and 136. Therefore, the target estimation unit 318 estimates that at least one of the in-vehicle devices 137 to 139 connected to the downstream side of the branch destination including the in-vehicle devices 132, 135, and 136 is the attack target.

In addition, in the attack path starting from the in-vehicle device 132, there are branches of a path toward the in-vehicle devices 135, 137, and 138 and a path toward the in-vehicle devices 136 and 139. In this case, the target estimation unit 318 compares the number of attack occurrences between the branch destination including the in-vehicle devices 135, 137, and 138 and the branch destination including the in-vehicle devices 136 and 139 among the plurality of branch destinations from the in-vehicle device 132.

In the example of FIG. 21, the number of attack occurrences in the in-vehicle devices 137 and 138 is 2 at the branch destination including the in-vehicle devices 135, 137, and 138. In addition, the number of attack occurrences in the in-vehicle device 139 is 1 at the branch destination including the in-vehicle devices 136 and 139. Therefore, the target estimation unit 318 estimates that at least one of the in-vehicle devices 137 and 138 connected to the most downstream point of the branch destination including the in-vehicle devices 135, 137, and 138 is the attack target.

Figure 22:
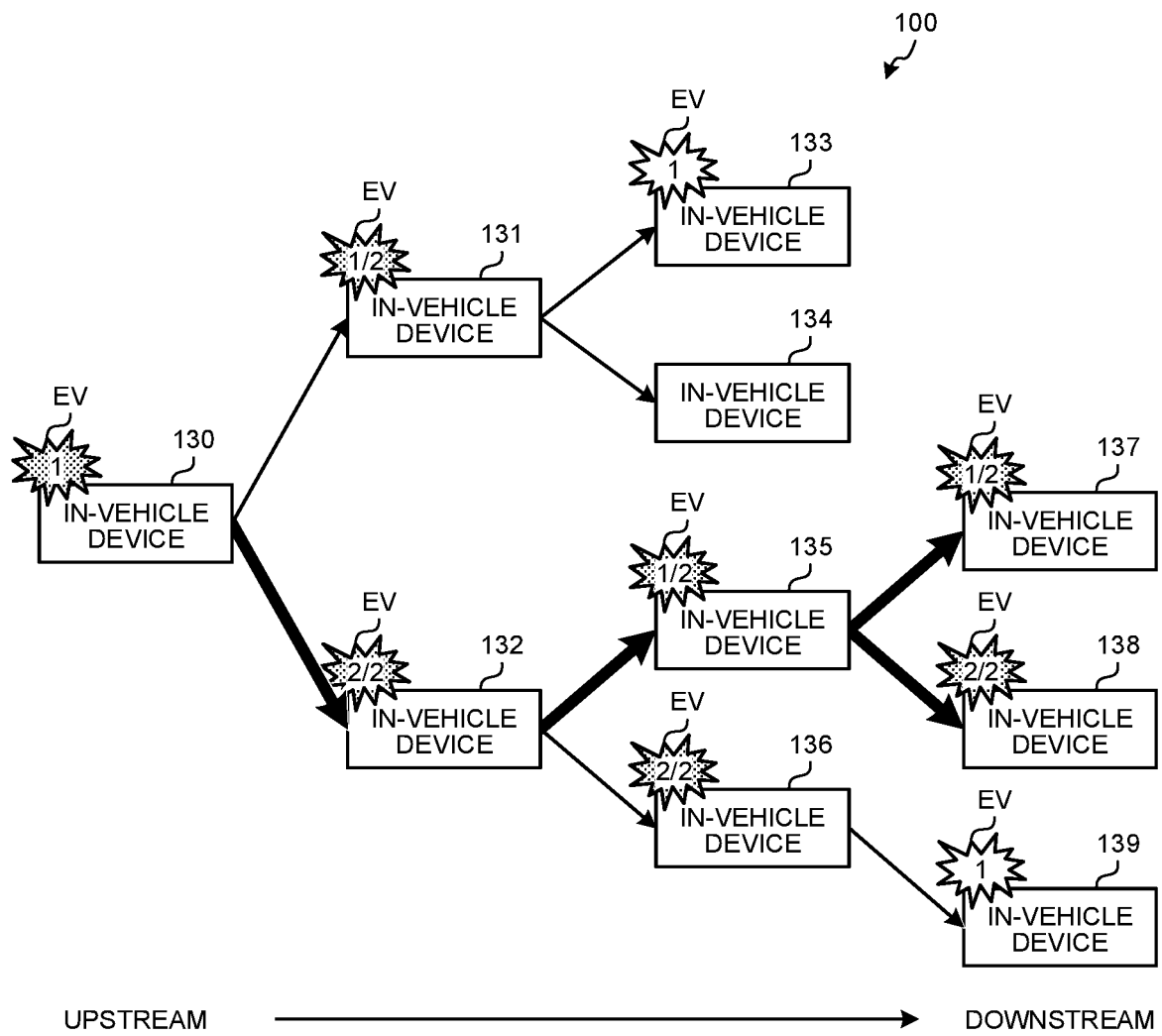
FIG. 22 is a diagram illustrating an example of an attack path generated by the IDM device according to Modification 2 of the embodiment on the basis of the count of the number of attack targets.

In the network configuration of the in-vehicle device group 100, when the attack target is estimated up to the in-vehicle devices 137 to 139 connected to the most downstream point, the target estimation unit 318 generates an attack path toward the in-vehicle devices 137 and 138, which are the in-vehicle devices 137 to 139 connected to the most downstream point and estimated to be the attack targets. FIG. 22 illustrates an example of the attack path generated by the target estimation unit 318.

FIG. 22 is a diagram illustrating an example of an attack path generated by the IDM device 310 according to Modification 2 of the embodiment on the basis of the count of the number of attack targets. As illustrated in FIG. 22, the target estimation unit 318 generates an attack path from the in-vehicle device 130 to the in-vehicle device 137 via the in-vehicle devices 132 and 135 and an attack path to the in-vehicle device 138.

As described above, even when the attack paths generated by the primary generation unit 103 and the secondary generation unit 104 branch in multiple directions on the downstream side of the network, the target estimation unit 318 narrows down the in-vehicle devices to be attack targets.

Next, an example of a method of generating an attack path by the IDM device 310 of Modification 2 will be described with reference to FIG. 23.

Figure 23:
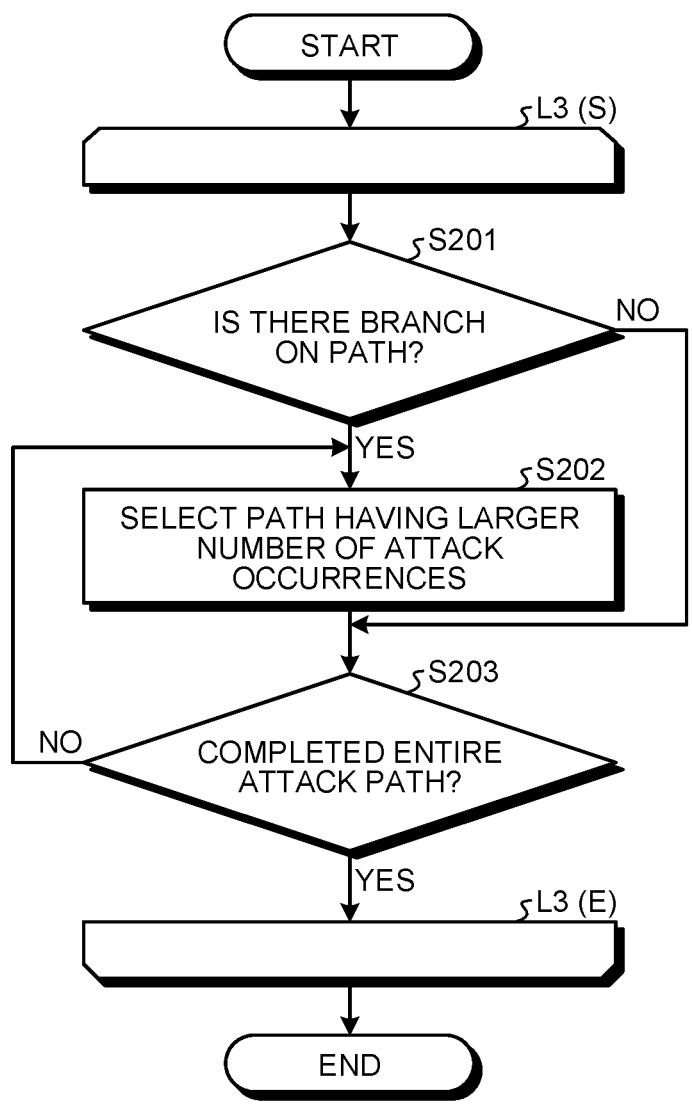
FIG. 23 is a flowchart illustrating an example of a procedure of generation processing of an attack path based on the number of attack occurrences by the IDM device according to Modification 2 of the embodiment.

FIG. 23 is a flowchart illustrating an example of a procedure of generation processing of an attack path based on the number of attack occurrences by the IDM device 310 according to Modification 2 of the embodiment. The processing of FIG. 23 is performed after the attack path generation processing by the primary generation unit 103 and the secondary generation unit 104.

As illustrated in FIG. 23, the target estimation unit 318 determines whether or not there is a branch on the attack path generated by the primary generation unit 103 and the secondary generation unit 104 (step S201). If there is no branch on the attack path (step S201: No), the target estimation unit 318 skips the process of step S202 and proceeds to the process of step S203.

If there is a branch on the attack path (step S201: Yes), the target estimation unit 318 selects an attack path with a large number of attack occurrences on the downstream side of the predetermined branch (step S202).

In addition, the target estimation unit 318 determines whether or not the processes of steps S201 and S202 have been completed over the entire attack path generated by the primary generation unit 103 and the secondary generation unit 104 (step S203). If there is an unprocessed portion in the attack path (step S203: No), the target estimation unit 318 repeats the processes from steps S201 to S203 in the loops L3(S) to L3(E) until the processes are completed over the entire attack path. When the process is ended over the entire attack path (step S203: Yes), the processing of the loops L3(S) to L3(E) are ended.

As described above, the attack path generation processing based on the number of attack occurrences by the IDM device 310 according to Modification 2 ends.

With the IDM device 310 of Modification 2, the number of occurrences of the event EV within a certain period of time is counted as the number of attack occurrences, and when the secondary attack path branches, an attack path toward one device or multiple devices of the in-vehicle devices 137 and 138 connected to the downstream side of the in-vehicle device 135 of the branch destination in which the number of attack occurrences is larger than that of other branch destinations among the plurality of branch destinations is generated.

As a result, for example, even in a case where a large number of branches occur in the attack path on the downstream side of the network, it is possible to narrow down the in-vehicle devices becoming as the attack targets. Therefore, the destination of the attack path can be visualized, and where the attacker is interested can be determined macroscopically.

According to the attack path generation method and the attack path generation device according to the present disclosure, it is possible to specify an attack path even when a plurality of devices are simultaneously attacked.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An attack path generation method executed by an information processing device, the information processing device comprising a hardware processor and being configured to generate attack paths in a plurality of devices by acquiring logs in the plurality of devices, the plurality of devices connected to a network, the network including at least one of a branch and a merge, each device of the plurality of devices having an attack detection function, the attack path generation method comprising:

generating a primary attack path without the at least one of the branch and the merge based on the acquired logs, by selecting an attack path including an in-vehicle device connected to a first point at which there is no branch or merge on the network or a second point where the branch or the merge on the attack path includes as few branches or merges as possible on the network;

generating a secondary attack path branching from the primary attack path or merging with the primary attack path based on the acquired logs; and outputting the generated primary attack path and the generated secondary attack path to a security information and event management device that performs attack determination and notifies of an abnormality, wherein the secondary attack path
includes an upstream device or a downstream device in which a first event assumed to be a first attack occurs within a certain period of time from a second event assumed to be a second attack on a first device included in the primary attack path and connected to a merging point or a branching point of the network.

2. The attack path generation method according to claim 1, wherein when generating the secondary attack path,
a path branching from the primary attack path to a second device is generated when the second event for the first device included in the primary attack path and connected to the branching point of the network among the plurality of devices and the first event for the second device not included in the primary attack path among two or more devices connected to branch destinations of the network occur within a first period.

3. The attack path generation method according to claim 2, further comprising:

generating a first attack path and a second attack path as the primary attack path, wherein
when generating the secondary attack path,
a second path branching from the first attack path to a fourth device is generated when a third event for a third device included in the first attack path and connected to a second branching point of the network among the plurality of devices and a fourth event for the fourth device not included in the first attack path among two or more devices connected to the branch destinations of the network occur within the first period.

4. The attack path generation method according to claim 1, wherein when generating the secondary attack path,
a path merging with the primary attack path from a sixth device is generated when the fifth event for a fifth device included in the primary attack path and connected to the merging point of the network among the plurality of devices and a sixth event for the sixth device not included in the primary attack path among two or more devices connected to the merging point on an upstream side of the fifth device occur within a second period.

5. The attack path generation method according to claim 4, further comprising:

generating a first attack path and a second attack path as the primary attack path, wherein
when generating the secondary attack path,
a second path merging with the second attack path from an eighth device is generated when a seventh event for a seventh device included in the first attack path and connected to a second merging point of the network among the plurality of devices and an eighth event for the eighth device not included in the first attack path among two or more devices connected to the second merging point on an upstream side of the seventh device occur within the second period.

6. The attack path generation method according to claim 1, further comprising:
counting a number of times of occurrence of events within a third period as a number of attack occurrences, and
when the secondary attack path branches, generating an attack path toward one or more devices connected on a downstream side of a device at a branch destination of which the number of attack occurrences is larger than that of other branch destinations among a plurality of branch destinations.

7. The attack path generation method according to claim 1, further comprising:
generating a group of primary attack paths including two or more devices among the plurality of devices, wherein
when generating the secondary attack path,
a path branching from the group to a ninth device is generated when a third attack on the ninth device on a second branching path associated with the group and a fourth attack on a tenth device connected to the group on a downstream side occur in a fourth period among the plurality of devices.

8. The attack path generation method according to claim 1, comprising:
estimating an attack scenario of the first event and the second event based on a known attack scenario.

9. The attack path generation method according to claim 1, wherein
the primary attack path is generated without the at least one of the branch and the merge based on the acquired logs, by selecting the attack path including the in-vehicle device connected to the first point at which there is no branch or merge on the network.

10. An in-vehicle attack path generation device that generates attack paths in a plurality of devices by acquiring logs in the plurality of devices, the plurality of devices connected to a network, the network including at least one of a branch and a merge, each of the plurality of devices configured as an in-vehicle electronic control unit having an attack detection function, the in-vehicle attack path generation device comprising:
a hardware processor configured to:
generate a primary attack path without the at least one of the branch and the merge based on the acquired logs, by selecting an attack path including an in-vehicle device connected to a first point at which there is no branch or merge on the network or a second point where the branch or the merge on the path includes as few branches or merges as possible on the network;
generate a secondary attack path branching from the primary attack path or merging with the primary attack path based on the acquired logs; and
output the generated primary attack path and the generated secondary attack path to an external security information and event management device that performs attack determination and notifies of an abnormality, wherein
the secondary attack path includes an upstream device or a downstream device in which a first event assumed to be a first attack occurs within a certain period of time from a second event assumed to be a second attack on a first device included in the primary attack path and connected to a merging point or a branching point of the network.

11. The in-vehicle attack path generation device according to claim 10, wherein
the hardware processor generates the primary attack path without the at least one of the branch and the merge based on the acquired logs, by selecting the attack path including the in-vehicle device connected to the first point at which there is no branch or merge on the network.

* * * * *